(12) United States Patent
Chevassu et al.

(10) Patent No.: US 8,308,211 B2
(45) Date of Patent: Nov. 13, 2012

(54) GRIPPER FOR CLAMPING PLATES, USED IN COMBINATION WITH A MANIPULATOR ARM, AND OFFSET BALANCING MODULE

(75) Inventors: Daniel Chevassu, Chateau du Loir (FR); Oliver Tiberghien, Saint Cyr sur Loire (FR); Jean-Noël Boyer, Mettray (FR)

(73) Assignee: ARO Welding Technologies, Chateau du Loir (FR)

( * ) Notice: Subject to any disclaimer, the term of this patent is extended or adjusted under 35 U.S.C. 154(b) by 770 days.

(21) Appl. No.: 12/299,576

(22) PCT Filed: May 16, 2007

(86) PCT No.: PCT/FR2007/051290
§ 371 (c)(1),
(2), (4) Date: Nov. 4, 2008

(87) PCT Pub. No.: WO2007/132132
PCT Pub. Date: Nov. 22, 2007

(65) Prior Publication Data
US 2009/0091149 A1    Apr. 9, 2009

(30) Foreign Application Priority Data
May 16, 2006  (FR) .................................. 06 04384

(51) Int. Cl.
*B25J 18/00* (2006.01)
(52) U.S. Cl. ......................................... 294/104; 294/198

(58) Field of Classification Search .................. 294/104, 294/192, 202, 198
See application file for complete search history.

(56) References Cited

U.S. PATENT DOCUMENTS

| 6,637,744 B2* | 10/2003 | Bettinelli | 271/226 |
|---|---|---|---|
| 6,666,489 B2* | 12/2003 | Kruger | 294/197 |
| 7,269,892 B2* | 9/2007 | Miyazaki | 29/739 |
| 2002/0125219 A1* | 9/2002 | Janssens et al. | 219/86.41 |

FOREIGN PATENT DOCUMENTS

DE   198 01 652        7/1999
DE   19801652 A1 *     7/1999

OTHER PUBLICATIONS

International Search Report from counterpart application No. PCT/FR2007/051290; Report dated Oct. 15, 2007.
Preliminary Search Report from priority patent application No. FR 06 04384; Report dated Jan. 24, 2007.

* cited by examiner

*Primary Examiner* — Saul Rodriguez
*Assistant Examiner* — Gabriela Puig
(74) *Attorney, Agent, or Firm* — Miller, Matthias & Hull LLP

(57) ABSTRACT

A gripper is disclosed. The gripper has a frame which is connected to a mobile subassembly including a fixed end and a mobile end respectively secured to a fixed arm and a mobile arm, and an actuator supported on the fixed arm for moving the mobile arm and end relative to the fixed arm and end, along a first degree of freedom, in translation or rotation, and a balancing module introducing an additional degree of freedom, in translation or rotation, which is offset outwards of the assembly formed by the mobile subassembly and the frame.

18 Claims, 18 Drawing Sheets

GRIPPER FOR CLAMPING PLATES, USED IN COMBINATION WITH A MANIPULATOR ARM, AND OFFSET BALANCING MODULE

CROSS-REFERENCE TO RELATED APPLICATIONS

This application is a U.S. national stage filing of International Patent Application No. PCT/FR2007/051290 filed on May 16, 2007, which claims priority under the Paris Convention to French Patent Application No. 06 04384, filed on May 16, 2006.

FIELD OF THE DISCLOSURE

The present invention relates to all types of grippers intended to clamp plates and used in combination with a manipulator arm, called a robot. Said robot can serve either to move the tool around the assembly to be formed or, conversely, to move the assembly past the tool, which in this case is fixed to a rigid stand.

BACKGROUND OF THE DISCLOSURE

More specifically, this invention relates to resistance welding grippers, of the general type comprising a rigid frame connected to a support such as a rigid stand or manipulator robot, and a movable subassembly connected to the frame and having a first welding electrode, called the fixed electrode, which is secured to a first arm, called the fixed arm, a second welding electrode, called the movable electrode, secured to a second arm, called the movable arm, and a welding actuator supported on said fixed arm in order to move the movable arm and electrode with respect to the fixed arm and electrode along a first degree of freedom in translation or rotation, so as to close or open the gripper, for the purpose of, respectively, clamping an assembly of plates to be welded between the electrodes (which have been brought toward each other by the actuator), or releasing the assembly of plates (by separating the electrodes from each other by means of the actuator), the gripper also having a balancing module, which introduces an additional degree of freedom in translation or rotation, between said support, on the one hand, and, on the other hand, an assembly incorporating said movable subassembly, in order to balance the forces which are exerted on the electrodes, particularly in the closed position.

SUMMARY OF THE DISCLOSURE

In prior art resistance welding grippers, there are two possible kinematics for the movable arm and electrode, depending on the work to be done:
the first degree of freedom is a translation of the movable arm and electrode with respect to the fixed arm carrying the fixed electrode, using linear guidance provided by the welding actuator, which is a linear actuator of any suitable known type, which may be hydraulic, pneumatic, mechanical or electrical, and which directly moves the movable arm and electrode, the gripper being known in this case as a C or a J gripper, as shown in the appended FIGS. 1 to 5; alternatively,
the first degree of freedom is a rotation of the movable arm and electrode around a shaft on the frame, with respect to the fixed arm carrying the fixed electrode, the gripper being known in this case as an X gripper or a scissor gripper, in which the welding actuator can once again be a linear actuator which is either mounted by its body on the fixed arm support so that it can pivot around a shaft parallel to the articulation shaft of the movable arm and electrode, or is fixed rigidly to the same fixed arm support, a suitable mechanical linkage with two degrees of freedom then enabling the rod of the actuator to move linearly in a given direction to follow the oscillating movements of the movable arm around the articulation shaft. The force for pivoting the movable arm and electrode is transmitted from the actuator to the movable arm by a lever to which the movable arm is fixed and which pivots around the articulation shaft, the end of the actuator rod pivoting on this lever, as shown in the appended FIGS. 6 and 7.

In FIGS. 1 to 7, identical references indicate identical or similar components in the C and X grippers shown in the different positions described below.

For the electrical spot welding of an assembly of plates 1, the C grippers of FIGS. 1 to 5 comprise, primarily, a fixed electrode 2 mounted at the end of a fixed arm 3 which is secured to the body 5 of a welding actuator 4, which may be, for example, of the pneumatic actuator type, whose piston 6 and rod 7 move as one unit with a movable arm 8, in the extension of the rod 7, and the free end of which supports a movable electrode 9, these components forming a subassembly mounted to be movable with an additional degree of freedom which, in these drawings, also corresponds to a translation, on a frame 10 rigidly fixed to a support which may be a manipulator robot or a rigid stand, this additional degree of freedom of the subassembly (2-9) with respect to the frame 10 being provided by a module 11 described below.

Similarly, in the X grippers shown in FIGS. 6 and 7, the fixed electrode 2 and the fixed arm 3 are fixed to a rigid arm support 12 which is mounted on a pivot shaft 13 around which a rigid lever 14 supporting the movable arm 8 and the movable electrode 9 pivots, the welding actuator 4, which is also linear, pivoting by means of its body 5 on the support 12 around a shaft 15 parallel to the shaft 13, while the free end of the rod 7 of the actuator 4 actuates the lever 14, on which the rod 7 pivots around a shaft 16 which is also parallel to the shaft 13, so as to cause the movable arm 8 and electrode 9 to pivot with respect to the fixed arm 3 and electrode 2, by rotation around the shaft 13 which is supported by a rigid bracket 17 of the frame 10 of the tool, which is fixed rigidly to the tool support (a fixed stand or manipulator robot).

An additional degree of freedom, which is a rotation, is imparted to the subassembly of the fixed and movable arms (3, 8) and electrodes (2, 9) and the welding actuator 4 with respect to the frame 10 by the pivoting of this subassembly with the arm support 12 and the pivoting lever 14 around the shaft 13, by means of a module 21, whose structure and functions are described below.

When the process of assembly by welding, which can start when the plates 1 are clamped between the electrodes 2 and 9, is automated, the gripper or the assembly of the plates 1 to be welded is carried on the end of an articulated arm of a manipulator robot. However, in the most common embodiment of the welding process, as described below, the gripper is conveyed by the robot and positioned in front of the assembly of plates 1, the problems being the same in the inverse case in which the assembly of plates 1 is conveyed and positioned in front of the gripper.

According to the trajectory programming, the robot positions the fixed electrode 2 of the gripper in front of the assembly of plates 1 to be welded. However, for technical reasons relating to:
the positioning accuracy of the robot;

the uncertainty in respect of the geometry of the gripper (due to the machining and assembly tolerances of its components and possible wear of the electrodes 2 and 9 during the process); and the error in the actual position of the assembly of plates 1 with respect to its theoretical position, a certain distance must be specified, in the programming of the robot, between the theoretical position of the fixed electrode 2 at the end of the fixed arm 3 and the theoretical position of the assembly of plates 1.

This distance must be sufficient to ensure that there is no contact between the electrode 2 of the fixed arm 3 and the assembly of plates 1 during the dynamic phases of the movement of the robot, in order to avoid any friction and/or pressure of this electrode 2 on the plates 1 which might cause the marking, scratching or deformation of the plates 1.

In practice, in a resistance welding process, this distance is in the range from approximately 5 to approximately 15 mm, and is called the backing-off trajectory.

After this phase of positioning the gripper with respect to the assembly of plates 1, the additional degree of freedom mentioned above is released in the gripper, in such a way that the movable subassembly incorporating the fixed and movable electrodes and arms (2, 3, 8 and 9) and the welding actuator 4 can then move relatively to its frame 10, this relative movement, permitted by the aforesaid module 11 or 21, being either a translation, parallel to that of the movable arm 8, as in the case of the C grippers of FIGS. 1 to 5, or a rotation around the shaft 13, as in the case of the X grippers of FIGS. 6 and 7, the purpose of this operation, called the docking operation, being to enable the electrode 2 of the fixed arm 3 to make contact with the assembly of plates 1 to be welded.

Ideally, this docking movement should be carried out completely without any force or impact which might deform the plates 1, while this movement must be provided without a precise knowledge of the difference between the theoretical and actual positions of the assembly of plates 1 and the fixed electrode 2, for different masses of the gripper and different positions of its centre of gravity, regardless of the inclination of the gripper in space.

After this docking operation, the welding actuator 4 is operated and moves the movable arm 8 in such a way that the movable electrode 9 is closed toward the fixed electrode 2 and clamps the assembly of plates 1 between the two electrodes 2 and 9. After the movable electrode 9 has made contact with the plates 1, a phase of applying and increasing the welding force is carried out. However, if the gripper is closed in the unloaded state (in the absence of plates 1), the position of the contact point between the fixed electrode 2 and movable electrode 9 is shifted as a function of the difference in flexibility between the fixed arm 3 and the movable arm 8, the size of this shift or displacement being directly proportional to the degree of force applied.

Consequently, in order to avoid any deformation of the plates 1, the position of the gripper (in other words, of its electrodes 2 and 9) must be corrected throughout the phase in which the force is increased, in such a way that the contact point between the electrodes 2 and 9 corresponds at all times to the actual position of the assembly of plates 1, this operation being called the operation of balancing or centering the gripper on the assembly of plates 1.

As in the case of the docking operation, for a gripper having a specified mass, it should ideally be possible for this balancing operation to be carried out autonomously and at the same level of quality for all inclinations of the gripper in space.

As a general rule, when the natural point of contact between the electrodes 2 and 9 is displaced toward the fixed arm 3, this is described as under-docking, and, conversely, when this natural point of contact is displaced towards the movable arm 8, this is described as over-docking.

A docking operation and/or a balancing operation which is uncontrolled or poorly controlled runs the risk of causing a deformation of the plates 1 which would become irreversible because of non-compliance with the constraint of the elastic limit of the plates, or else after the completion of the assembly by welding, and an unbalance of forces between the two electrodes 2 and 9 (with a loss of force on the fixed arm 3 in the case of over-docking, or an increased force in the case of under-docking), resulting in a degradation of the quality of the assembly process. In fact, the extent of the deformation of the plates 1 with respect to the unbalance of forces between the two electrodes 2 and 9 is a function of the rigidity of the assembly and of the position of the gripping means.

Finally, after the docking and balancing operations, it is necessary to carry out an operation, called the backing-off operation, to return the gripper to a reference position and keep it there, ideally in an equally autonomous way, without adjustment and for all orientations of the gripper in space. In what is called the backed-off position, the two electrodes 2 and 9 are separated from the assembly of plates 1 and placed in an initial position from which the docking operation can be executed for the next spot weld.

DETAILED DESCRIPTION OF THE DISCLOSURE

As mentioned above, in an application in which the gripper is fixed to a support and the assembly of plates 1 to be welded is conveyed by a manipulator robot, the problems remain the same, since it is still necessary to carry out the operations of docking and balancing the gripper with respect to the assembly of plates 1, followed by backing-off (return to the reference position); it is only the inclination of the gripper that ceases to be a variable in this case.

In prior art resistance welding grippers, as shown in FIGS. 1 to 7, the docking, balancing and backing-off operations are permitted by the additional degree of freedom, in the form of the translation of the movable subassembly (2, 3, 4, 8, 9) with respect to the frame 10 in C grippers, or the oscillation (rotation) of the movable subassembly around a shaft 13 of the frame 10 in X grippers, and are provided by means of the module 11 or 21, in a C gripper or an X gripper respectively, which essentially comprises at least one translational guide box 11*a* or 21*a*, supplemented if necessary by balancing springs, and at least one actuator 11*b* or 21*b* for docking, backing-off and locking and holding the movable subassembly in the backed-off position, this actuator 11*b* or 21*b* possibly having, if the guide box has no balancing spring, at least two resilient balancing means stressing in opposite directions at least one member of this actuator which is fixed to said box with respect to movement, for example a pneumatic actuator having two pressurized gas chambers, one on each side of a piston connected rigidly by the actuator rod to a slide mounted so as to be slidable by translation in the box, in order to provide two opposing balancing resilient means.

In the balancing modules indicated by 11 in FIGS. 1 to 5 and by 21 in FIGS. 6 and 7, the docking and backing-off functions are combined with the balancing function, and the means of implementing these three functions are combined to permit either a linear movement of the movable subassembly, also called the carriage, comprising the two arms 3, 8, the two electrodes 2, 9 and the welding actuator 4, with respect to the frame 10 which is fixed rigidly to the support (see FIGS. 1 to 5), or a rotational movement of the movable subassembly with respect to the frame 10 (see FIGS. 6 and 7).

In FIGS. 1 to 7, each of the balancing modules 11 and 21 comprises a linear guide box 11a or 21a, which possibly carries out the additional function of docking and balancing by means of opposing springs, and a linear backing-off actuator 11b or 21b, which possibly also carries out the function of docking and balancing if the box 11a and 21a has no balancing springs (FIGS. 4 and 5) or is not present (FIG. 7).

When the three combined functions are carried out by oscillatory (rotational) movements of the movable subassembly with respect to the frame 10, the means of implementation can be transposed from those mentioned above, and can comprise at least one rotary docking and backing-off actuator, together with at least one box for rotational guidance and possibly for balancing by means of at least two opposing torsion springs.

In FIGS. 1 to 3, the balancing, docking and backing-off module 11 of the prior art C gripper is composed of a box 11a with springs, for translation, docking and balancing, and a backing-off actuator 11b which is a single-acting actuator, generally of a pneumatic or hydraulic type.

The box 11a has a rigid rectangular body 22, in which two identical cut-outs are formed, one being located in each of the two opposite large sides, and each being passed through by a respective one of two guide columns 23 which are identical, spaced apart, parallel to each other and to the large sides of the body 22, fixed to the body 22 at their two ends, and mounted slidably each in a corresponding one of two identical tubular slides or sleeves 24, parallel to the frame 10 and fixed thereto, while the body 22 is fixed rigidly under the body 5 of the welding actuator 4.

Each of the two opposing axial end parts of each column 23 which protrudes from each end of the corresponding sleeve 24 is surrounded by a respective one of two identical opposing helical springs 25, one axial end of each spring bearing on the body 22, at the corresponding end of the corresponding cut-out, while the other axial end of each spring bears on the corresponding axial end of the corresponding sleeve 24. Thus, four balancing springs 25 bear on the sleeves 24 which are rigidly fixed to the frame 10 to stress the body 22 of the box 11a, and therefore also the movable subassembly which is rigidly connected to it, axially to one or other side, in order to balance the gripper, after the movable subassembly (2, 3, 4, 8, 9) has been translated as a result of the docking movement from the backed-off position (the initial reference position) of FIG. 1 to the balancing position of FIG. 2, by the inversion of the two positions of the fluid drive valve 26, which is interposed between the actuator 11b on the one hand, and a pressurized fluid supply pipe and a fluid return pipe on the other hand.

Initially, the movable subassembly has been brought to the backed-off position (FIG. 1), in which the fixed electrode 2 is separated from the plates 1, by admitting pressurized fluid into the operating chamber 27a, which is delimited in the cylinder 27 of the actuator 11b by the piston 28 which is fixed by means of the rod 29 to the body 22 of the box 11a, until the piston 28 is made to bear on the cylinder 27. This movement of the piston 28 and of the rod 29 causes the translation of the assembly composed of the body 22 of the box 11a and the movable subassembly (2, 3, 4, 8, 9) in the direction which compresses the springs 25 on the right of the sleeves 24 and relaxes the springs 25 on the left of the sleeves 24. The movable subassembly is then connected rigidly to the frame 10 and the gripper is in the reference position, called the backed-off position. The reversal of the valve 26 causes the fixed electrode 2 to dock against the plates 1 as a result of the evacuation of the operating chamber 27a of the actuator 11b which was previously under pressure, under the action of the relaxation of the previously compressed springs 25, causing the body 22 of the box 11a to be translated in the opposite direction together with the movable subassembly (2, 3, 4, 8, 9), which is thus released from its stop, until the movable subassembly and the body 22 of the box 11a are balanced between the two opposing pairs of springs 25 (see FIGS. 2 and 3).

The sroke of the docking operation depends on the stiffness and tension of the springs 25, the mass and inclination of the load to be balanced, and any friction which may retard the movement of the load.

When the balanced position has been reached, the movable subassembly retains a degree of axial flexibility, due to the springs 25.

In this example, the cylinder 27 of the actuator 11b is fixed rigidly, like the sleeves 24, to the frame 10, and the body 22 of the box 11a is fixed rigidly to the movable subassembly. In a variant, the sleeves 24 can be fixed to the movable subassembly, and the body 22 of the box can be fixed to the frame 10, in which case the rod 29 of the piston 28 of the actuator 11b passes through the body 22 and drives the sleeves 24. In another variant, the cylinder 27 of the actuator 11b can be fixed to whichever of the body 22 and the sleeves 24 which is, or are, fixed to the movable subassembly, in which case the rod 29 of the piston 28 bears on the other (or others) of the aforesaid element or elements which is, or are, fixed to the frame 10, to move the movable subassembly in translation with respect to the frame 10, against the action or under the action of the springs 25.

In the C gripper variant of FIGS. 4 and 5, the box 11a differs from that of FIGS. 1 to 3 only in the absence of the springs 25, and consequently does not carry out the docking and resilient balancing function, but only that of guiding the translation of the movable subassembly with respect to the frame 10 by means of the columns 23 and the sleeves or slides 24.

The docking and balancing function is provided by the backing-off actuator 11b, which is a double-acting pneumatic actuator in which the cylinder 27 is fixed to the frame 10 and the rod 29 of the piston 28 is fixed to the body 22 of the box, which is itself fixed to the body 5 of the welding actuator 4. The pneumatic operation is provided by the two-position valve 26 which interacts with a control valve 30 for controlling or stopping the supply of compressed air to one 27a of the two operating chambers 27a and 27b of the actuator 11b (the right-hand chamber in FIGS. 4 and 5) or the evacuation of this chamber, the compressed air being evacuated from the other operating chamber 27b or supplied to this other chamber 27b through the valve 26.

Initially, the chamber 27a of the actuator 11b is supplied with fluid, while the chamber 27b is evacuated through the valve 26 so as to push the piston 28 back until it bears on the cylinder 27, thus also pushing back the movable subassembly into the backed-off position (the reference position bearing on the frame 10) by means of the rod 29, in such a way that the movable subassembly is then connected rigidly to the frame 10 (FIG. 5), the fixed electrode 2 being separated from the plates 1. The valve 30 can be used to isolate the pneumatic actuator 11b in this position, in order to hold the gripper in this backed-off position.

The docking and balancing operations are then carried out by causing the reversal of the valve 26 in order to re-pressurize the chamber 27b while using the valve 30 to control the pressure difference between the two chambers 27a and 27b of the actuator 11b, so as to move the piston 28 and the rod 29, and consequently the movable subassembly, thus bringing the fixed electrode 2 into contact with the plates 1 (docking) and compensating the effect of the mass of the load (balancing—see FIG. 4).

Because of the control of the pressure difference between the chambers 27a and 27b, and as a result of the difference in active area between the two opposite sides of the piston 28 due to the presence of the rod 29, the gripper is finely balanced over the whole of the stroke required for the docking operation. By using at least one proportional drive controller for the valve 26 and the control valve 30, the balancing operation can be carried out for all orientations of the gripper in space during the execution of the welding process.

Docking, balancing and backing-off are thus carried out pneumatically in this variant of the C gripper.

In this last-mentioned variant, the two chambers 27a and 27b containing pressurized gas on either side of the piston 28 which is connected rigidly by the rod 29 to the body 22 of the box, and therefore to the movable subassembly, form the two opposing resilient balancing means.

Similarly, the variants of the X gripper shown in FIGS. 6 and 7 differ from each other in that the gripper of FIG. 6 benefits from spring balancing by means of the guide box 21a of the module 21 which also provides the docking function, while the backing-off functions are provided by the single-acting pneumatic or hydraulic actuator 21b, whereas, in the gripper of FIG. 7, the balancing module 21 does not comprise a guide box, but simply a double-acting pneumatic actuator 21b which carries out the functions of docking, balancing and backing-off the gripper.

In FIG. 6, the guide and balancing box 21a comprises a piston 31, fixed to a rod 32 mounted pivotably on the arm support 12 around a shaft parallel to the rotation shaft 13, and the piston 31 is mounted slidably in a cylinder 33 which is mounted pivotably, at its end opposite to that through which the rod 32 passes, on the rigid bracket 17 of the frame 10, around a shaft which is also parallel to the rotation shaft 13, the cylinder 33 housing two opposing helical springs 34, each bearing on one of the ends of the cylinder 33 at one end, and bearing on a respective one of the two opposite sides of the piston 31 at the other end. Thus the two springs 14 balance the movable subassembly in its rotation around the shaft 13 with respect to the frame 10, in the same conditions as the springs 25 of the C gripper of FIGS. 1 to 3.

The single-acting linear actuator 21b of the X gripper of FIG. 6 has its cylinder 35 and its rod 36 mounted so that their opposite ends pivot, respectively, on the rigid bracket 17 of the frame 10 and on the arm support 12, around shafts parallel to the shaft 13, and the piston 37, fixed to the rod 36, delimits in the cylinder 35 an operating chamber 35a (on the side of the rod 36) which is selectively made to communicate, through the same two-position fluid valve 26 as that of FIGS. 1 to 5, with a pressurized fluid supply line or with a return pipe for this fluid, the supply of pressurized fluid to this operating chamber 35a enabling the piston 37 to be made to bear on the pivotably mounted part of the cylinder 35, thus pivoting the arm support 12 and consequently the movable subassembly supported thereby, by rotation around the shaft 13, to bring this movable subassembly into the backed-off position (the initial reference position), in which the fixed electrode is separated from the plates 1, and hold it there, while the piston 31 inside the box 21a is moved toward the outside of the cylinder 33 (on the side of the rod 32), thus compressing one of the springs and relaxing the other. When the control valve 26 is reversed, the operating chamber 35a of the actuator 21b is depressurized by being put into communication with an exhaust line 26a. Under the action of the balancing springs 34, the piston 31 returns to a balanced position inside the box 21a, causing the arm support 12 to pivot with respect to the rigid bracket 17 of the frame 10, this pivoting of the arm support 12 simultaneously exerting a pull on the rod 36 of the actuator 21b, whose piston 37 is moved in the direction which tends to reduce the volume of the operating chamber 35a, thus causing the fixed electrode 2 at the end of the fixed arm 3 connected to the support arm 12 to come into contact with the plates 1, in the docking and balancing position.

In FIG. 7, the pneumatic balancing of the gripper is provided by the actuator 21b which, as mentioned previously, is a double-acting pneumatic actuator, operated by the valve 26 and the control valve 30 used in the same conditions to provide the pneumatic balancing of the C gripper of FIGS. 4 and 5. The operation of the valve 26 causes the chamber 35b of the actuator 21b to be connected to the exhaust line 26a and therefore depressurized. The piston 37 then comes to bear on the pivoting end of the cylinder 35, enabling the gripper to be held in this backed-off position.

The docking and balancing operations are then carried out by causing the valve 26 to be reversed in order to repressurize the chamber 35b and by using the valve 30 to control the pressure difference between the two operating chambers 35a and 35b, so as to compensate the torque around the rotation shaft 13 created by the mass and the position of the centre of gravity of the movable subassembly, and, as in the example of the C gripper of FIGS. 4 and 5, at least one proportional drive controller is preferably used to ensure that the balancing operation can be carried out with the same flexibility for all orientations of the gripper in space during the welding process.

Thus, according to the prior art, in both C grippers and X grippers, the backing-off, docking and balancing functions are provided by means which form an integral part of the gripper, since they are mounted between the movable subassembly of the two arms, two electrodes and the welding actuator, on the one hand, and the frame rigidly connected to the gripper support on the other hand, these functions requiring an additional degree of freedom in the gripper (which is added to the degree of freedom provided by the welding actuator), either in the form of a translational movement (linear docking) or in the form of a partial rotation (curvilinear docking by oscillation around a rotation shaft).

In all cases, the movable part of the gripper in the course of these backing-off, docking and balancing operations is the subassembly comprising the fixed arm and electrode, the movable arm and electrode and the welding actuator (the principal actuator for closing the gripper), but is never the gripper as a whole.

The fundamental concept of the invention is that the balancing function is provided not by means forming an integral part of the tool, but by means mounted outside the actual gripper, while the known pneumatic, hydraulic, electromagnetic or electromechanical means are retained for the balancing operation, in order to benefit from the following advantages.

The balancing function can be provided as an option, without adding to the cost of the basic gripper; this is a particularly valuable feature in the case of applications not requiring the balancing function, for example where the docking and positioning of the fixed electrode on the assembly of plates are provided directly by the manipulator robot. In this case, the additional degree of freedom related to this balancing function should be eliminated in the gripper, since the robot, which has a sufficient degree of accuracy, is informed about the change in the geometry of the gripper, relating in particular to the wear of the electrodes and the shift of the contact point between the electrodes when force is applied. Because of the knowledge of these values, the uncertainty in respect of the relative positioning of the plates is reduced, and the robot itself can carry out the operations for docking the gripper on the plates, this solution having the advantage of being economical due to the elimination of the degree of freedom in the gripper body, and being effective regardless of the orientation of the gripper in space.

Another advantage of the invention is that the balancing module (composed of the balancing means) can be standardized and common to all grippers, regardless of their kinematics, while simultaneously enabling the basic gripper to be simplified considerably because of a major reduction in the number of components.

For this purpose, the invention proposes a gripper which is intended to clamp plates and which is used in combination with a manipulator arm, called a robot, the gripper comprising:
- a rigid frame connected to a support, such as a rigid stand or said robot,
- a movable subassembly, connected to said frame, and having:
  - a first arm, called the fixed arm,
  - a second arm, called the movable arm, and
  - an actuator, supported on said fixed arm in order to move the movable arm with respect to the fixed arm, along a first degree of freedom, in translation or rotation, so as to close or open the gripper, in order to clamp an assembly of plates between the fixed and mobile arms, or to release the assembly of plates, respectively, and a balancing module, introducing an additional degree of freedom of translation or rotation between the support, on the one hand, and an assembly incorporating said movable subassembly on the other hand, in order to balance the forces which are exerted on the respective ends of the fixed and movable arms in the closed position, the arrangement being characterized in that said balancing module is offset outside the assembly formed by said movable subassembly and said frame.

This offsetting of the balancing module outside the assembly formed by the movable subassembly and the frame does not in any way prevent the balancing module from being combined, in the way known from prior art resistance welding grippers and described above with reference to FIGS. 1 to 7, with docking means for bringing the fixed end into contact with the assembly of plates by the movement of said movable subassembly after the release of said additional degree of freedom, following an initial positioning of the open gripper with an initial clearance between the assembly of plates and the fixed end, and/or with backing-off means, for moving the movable subassembly to a reference position in which it is in abutment with respect to said support and holding it there, the balancing module being advantageously combined with docking means and with backing-off means in a gripper according to the invention.

According to the invention, the balancing module can be mounted to form an interface between two parts of said support, a first of these parts being fixed to said frame and/or to the movable subassembly while the second part forms the rest of the support or is fixed to the rest of the support, but the balancing module is advantageously mounted to form an interface between said support and said frame and/or movable subassembly.

In the latter case, it is advantageous for the balancing module to be fixed to a side of the frame supporting the movable subassembly and/or the body of the actuator of the movable subassembly.

The balancing module can, as in the case of the known prior art balancing modules, allow translational or rotational movements of the movable subassembly and its frame with respect to the support, by constructing the combined balancing, docking and backing-off module as an independent module fixed to one of the sides of the gripper, at the interface at the point at which the gripper is fixed by its frame to the support, which may be of the fixed support stand or manipulator arm type.

Regardless of whether the balancing module allows translational or rotational movements of the movable subassembly and its frame with respect to the support, the balancing module advantageously comprises:
- at least one box for guiding the relative movement, along the additional degree of freedom, between the movable subassembly with its frame and the support,
- at least two resilient balancing means applying opposing stresses to at least one member which is guided in the guide box, or is fixed to said box with respect to movement, and
- at least one actuator for docking and backing-off the movable subassembly and for securing and holding it in the backed-off position.

In particular, in a gripper of the C type, having a linear movement of the movable arm with respect to the fixed arm, the balancing module is advantageously installed in such a way that the translational movements allowed by said module are substantially parallel to the movements of the movable arm, and are therefore substantially perpendicular to the plane of assembly of the plates.

Advantageously, in a gripper of the X type, having rotational movements of the movable arm with respect to the fixed arm, the balancing module, which can be the same as that mounted on a C gripper, is installed in such a way that the translational movements allowed by the module are also substantially perpendicular to the plane of assembly of the plates, and therefore substantially parallel to the direction of the two electrodes placed end to end in the closed position of the X gripper.

In an advantageous embodiment, in which the structure and the mounting of the balancing module on the grippers of one or other of the C and X types is simplified, and the construction of these grippers is also simplified, the balancing module is mounted on a first face of an interface plate which is turned toward a member which is fixed to the support, the module bearing on this member so as to move said interface plate, the second face of which is fixed to the frame and/or to the movable subassembly. Advantageously, the balancing module can be mounted on said first face of said interface plate in one or other of at least two positions allowing translational movements substantially parallel to either one or the other, respectively, of at least two directions which are inclined with respect to each other, and which are preferably substantially perpendicular to each other, in the plane of said first face, according to whether the gripper is of the C type or the X type, in which the movable arm moves by translation or rotation, respectively, with respect to the fixed arm.

Preferably, in this case, said second face of the interface plate is provided with means for rigidly fixing the fixed arm and the actuator of the movable subassembly.

The gripper according to the invention is advantageously a resistance welding gripper and the respective ends of the fixed and movable arms are welding electrodes.

In a welding gripper of this type, as in the C and X grippers according to the prior art, a welding transformer is advantageously incorporated in the assembly formed by the movable subassembly and the frame, and is fixed to the frame and/or to the fixed arm.

In this case, the welding transformer is advantageously fixed rigidly to said second face of the interface plate.

Advantageously, in order to make the balancing module and the interface plate fully interchangeable between X grippers and C grippers, said interface plate is also pierced with a through hole designed to receive an articulation shaft of the rotatably movable arm, said articulation shaft preferably being additionally mounted in a reinforcing plate fixed rigidly between said articulation shaft and the welding actuator, in a gripper of the X type.

Additionally, when a welding transformer is fixed to the second face of the interface plate, two electrical conductors are advantageously fixed to the output of the welding transformer, each being intended to supply power to a respective one of the two movable and fixed arms of the movable subassembly, the conductor for connection to the fixed arm extending from the transformer outlet to a clamping sleeve which is fixed to and projects from the second face of the interface plate, so as to fix the fixed arm rigidly to said interface plate.

In an embodiment which is particularly suitable for providing interchangeability between C and X grippers, the gripper according to the invention is provided with a module whose guide box advantageously has a rigid rectangular frame which is passed through in a way parallel to two opposite sides, preferably the large sides, by two guide columns, fixed rigidly to said interface plate, spaced apart from each other and parallel, and guided with respect to translation at their ends on bearings fixed to the frame, at least one bar being fixed securely to the columns and being connected to the rod of a linear actuator of the jack type, parallel to the columns and extending between them, the cylinder of the actuator being fixed to the frame of the box, the frame being fixed directly or by means of a rigid intermediate support to the manipulator arm or to a rigid stand, or, conversely, the frame being fixed rigidly to the first face of the interface plate and the rigid subassembly formed by the columns and the bar or bars being fixed directly or by means of a rigid intermediate support to the manipulator arm or to a rigid stand, in such a way that the actuator can provide docking and backing-off movements, at least one guide column being surrounded by two opposing helical springs, each of which has one end bearing on the frame and the other end bearing on at least one of the bars, on the side opposite the other spring, or said actuator being pneumatic with two pressurized gas chambers, one on either side of a piston connected rigidly by the rod to at least one of the bars, in order to form the two opposing resilient balancing means.

Other characteristics and advantages of the invention will be made clear by the following non-limiting description of examples of embodiments described with reference to the appended drawings, in which.

Figure 6:
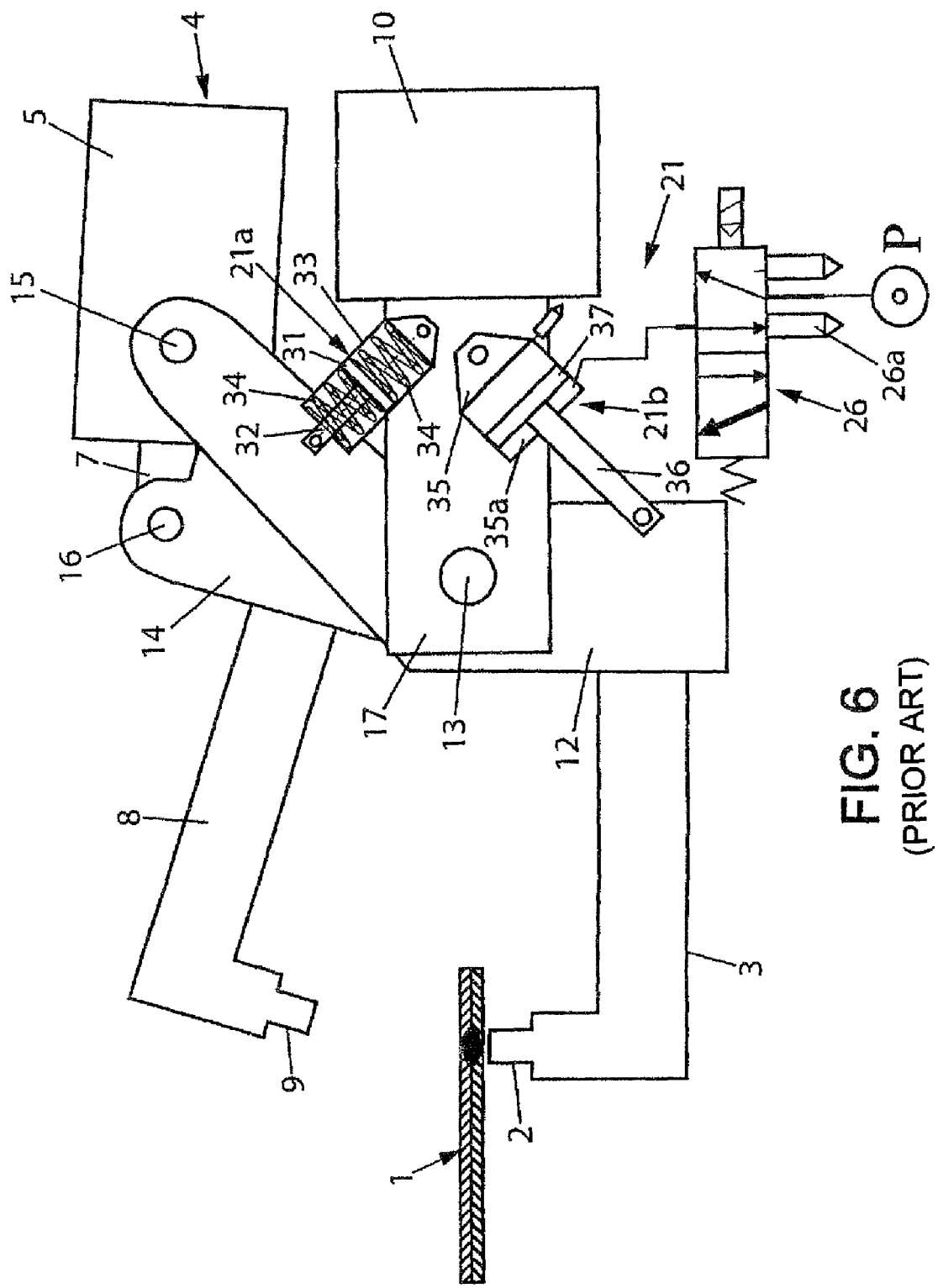
FIG. 6 is view similar to FIG. 1 of an X gripper according to the prior art with a spring balancing module, in the docking/balancing position.
Figure 7:
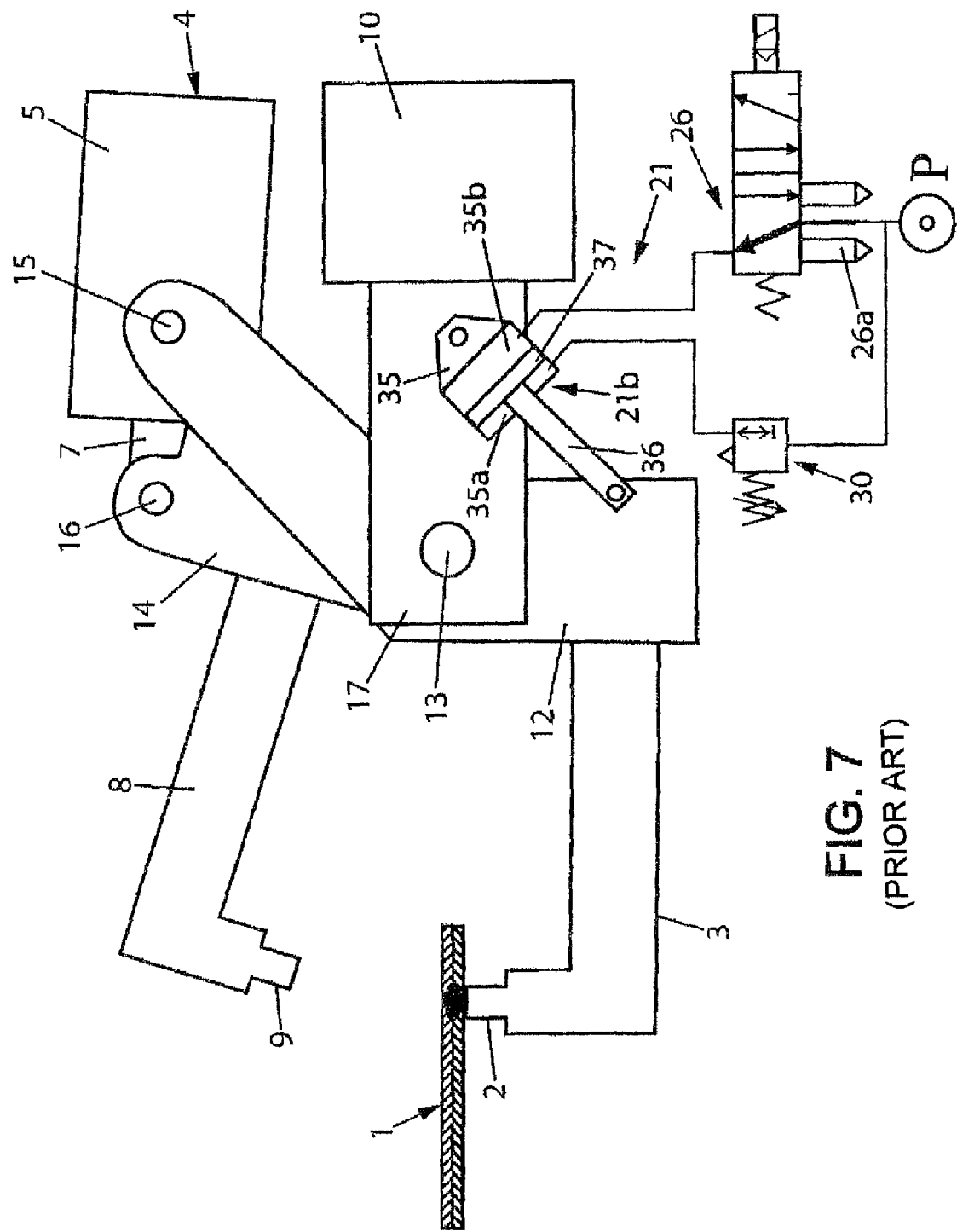
FIG. 7 is a view similar to FIG. 6 of an X gripper according to the prior art having a pneumatic balancing module, in the same position as in FIG. 6.
Figure 8:
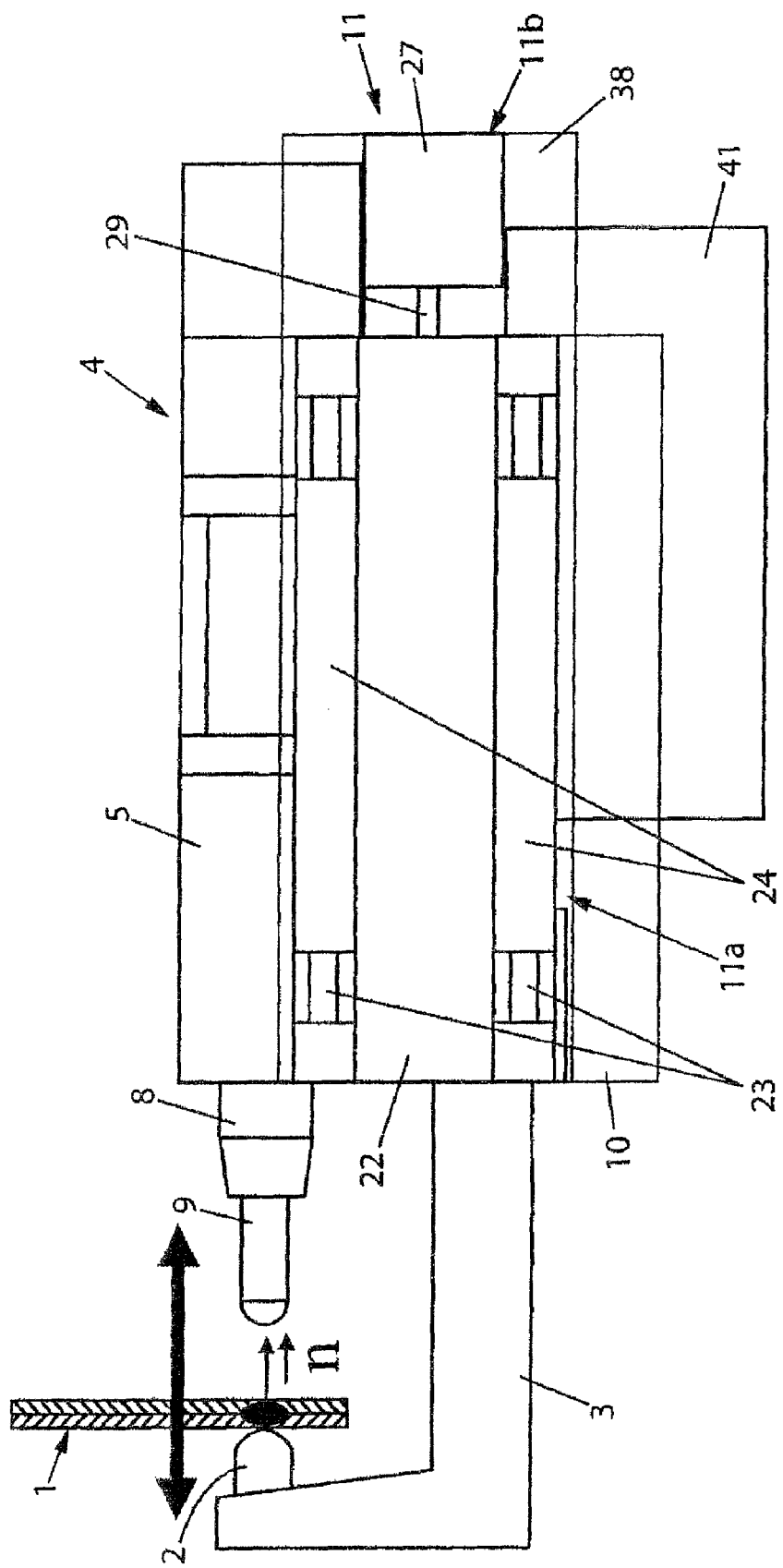
FIG. 8 is a schematic view, partially in side Elevation and partially in section, of a C gripper with a pneumatic balancing module, similar to that of FIGS. 4 and 5, but with the independent balancing module placed at one side of the gripper and with linear guidance parallel to the vector $\vec{n}$ perpendicular to the plane of assembly of the plates.
Figure 9:
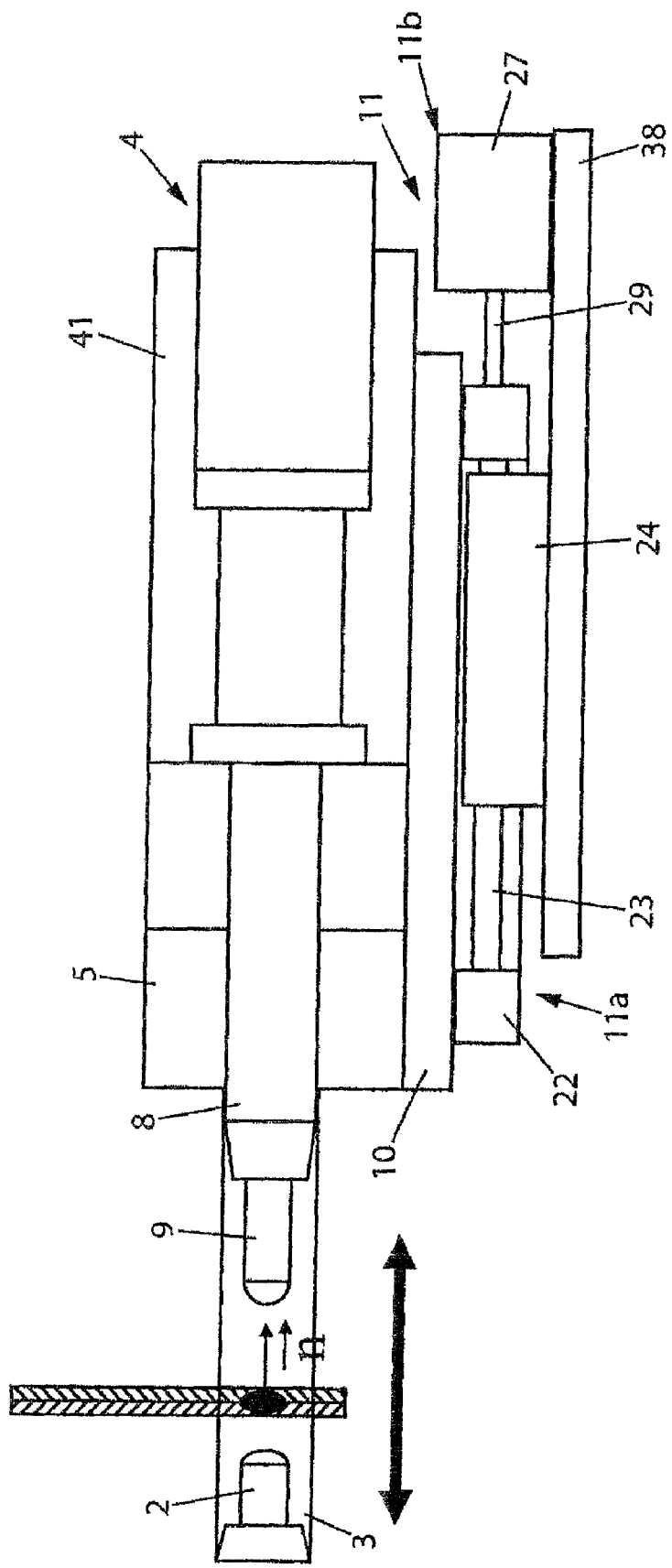
FIGS. 9 and 10 are schematic views, in plan and from the face respectively, of the C gripper with the pneumatic balancing module of FIG. 8.
Figure 10:
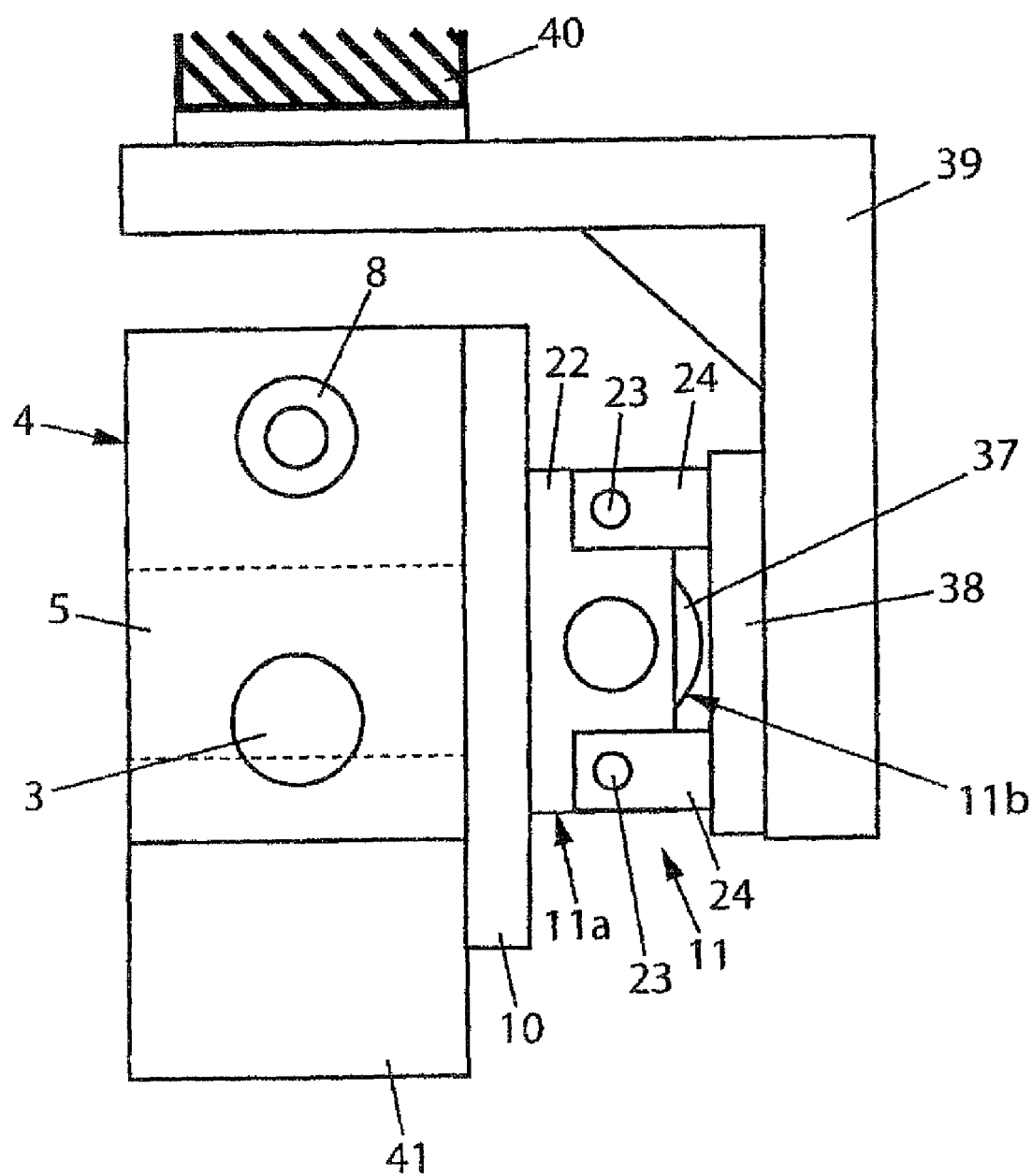
Figure 11:
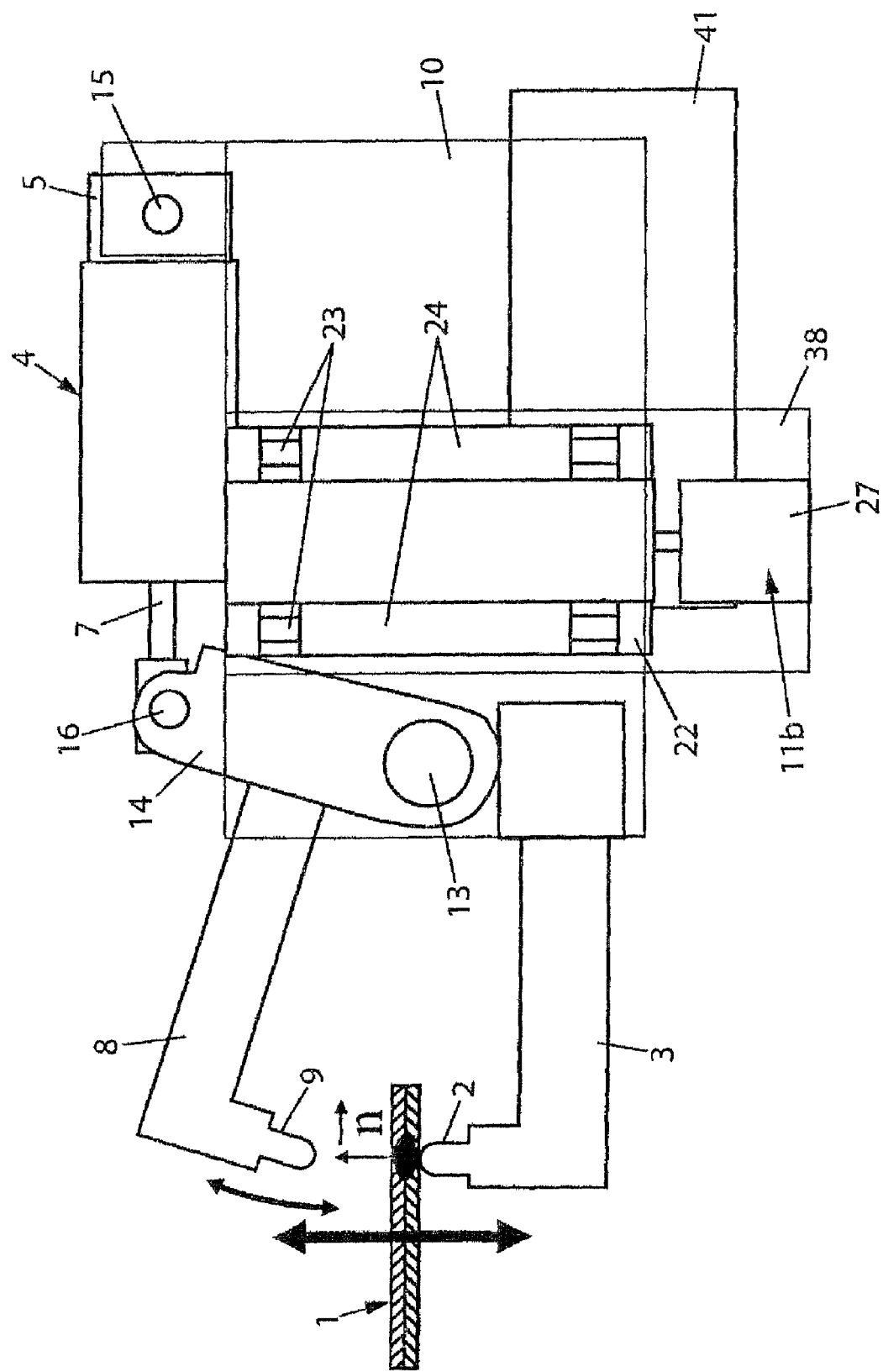
Figure 12:
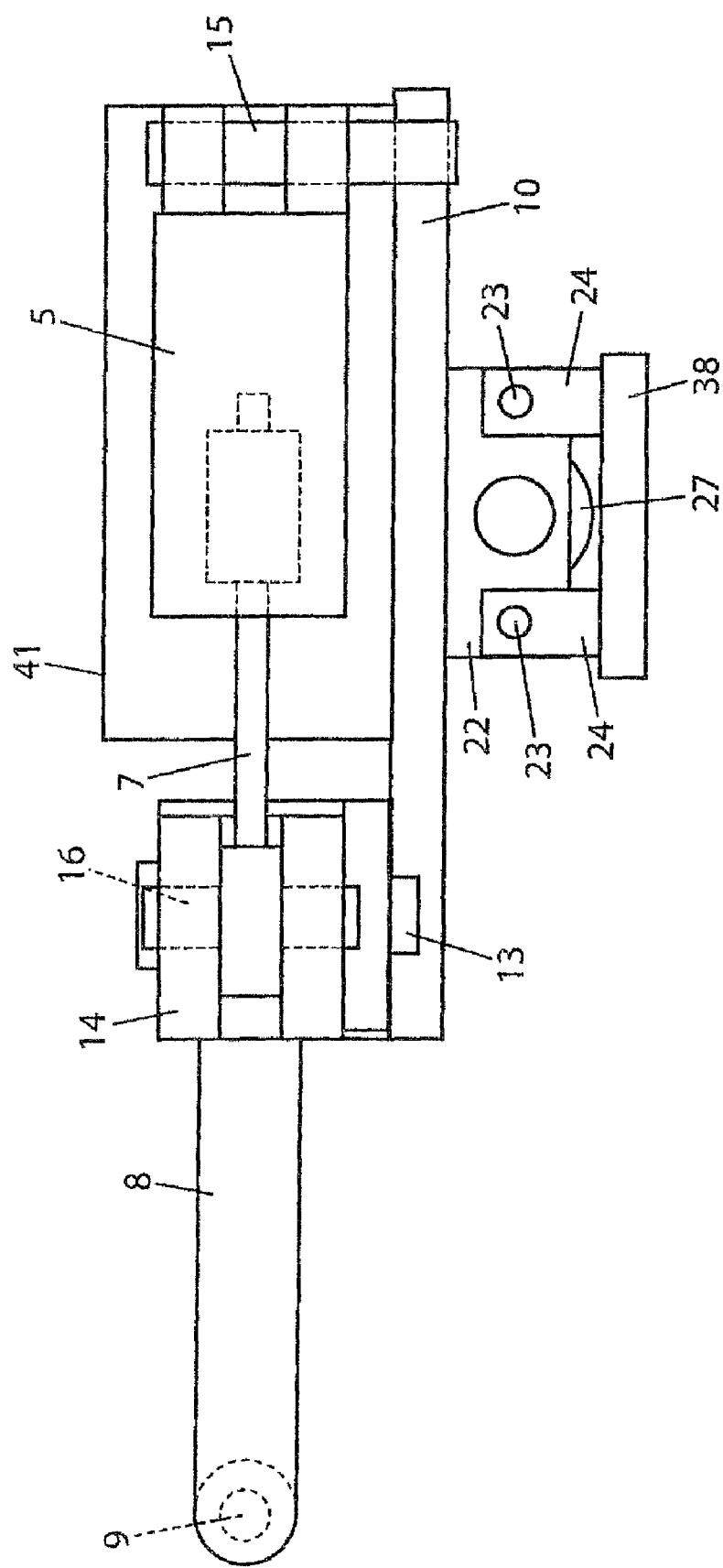
Figure 13:
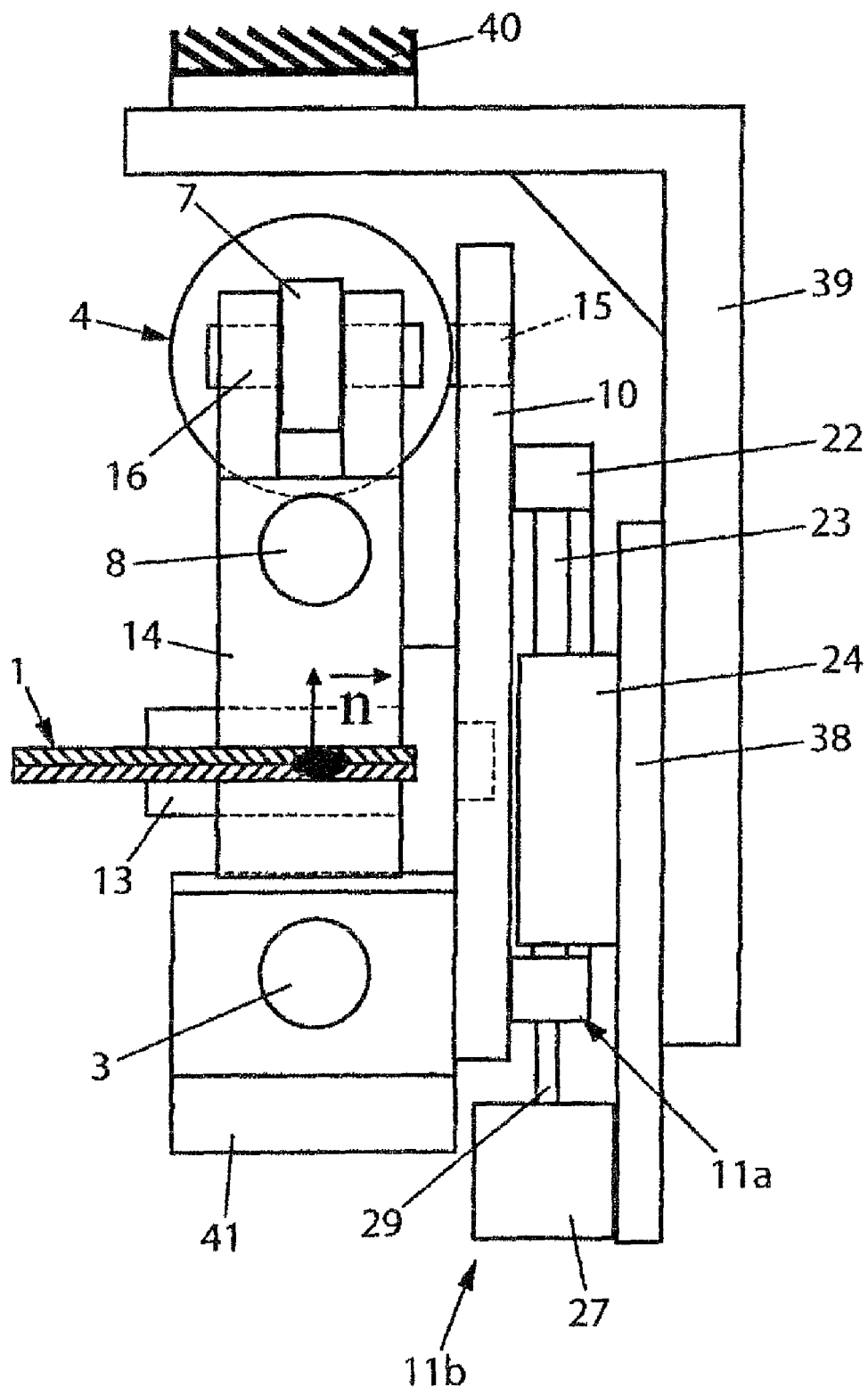
Figure 14:
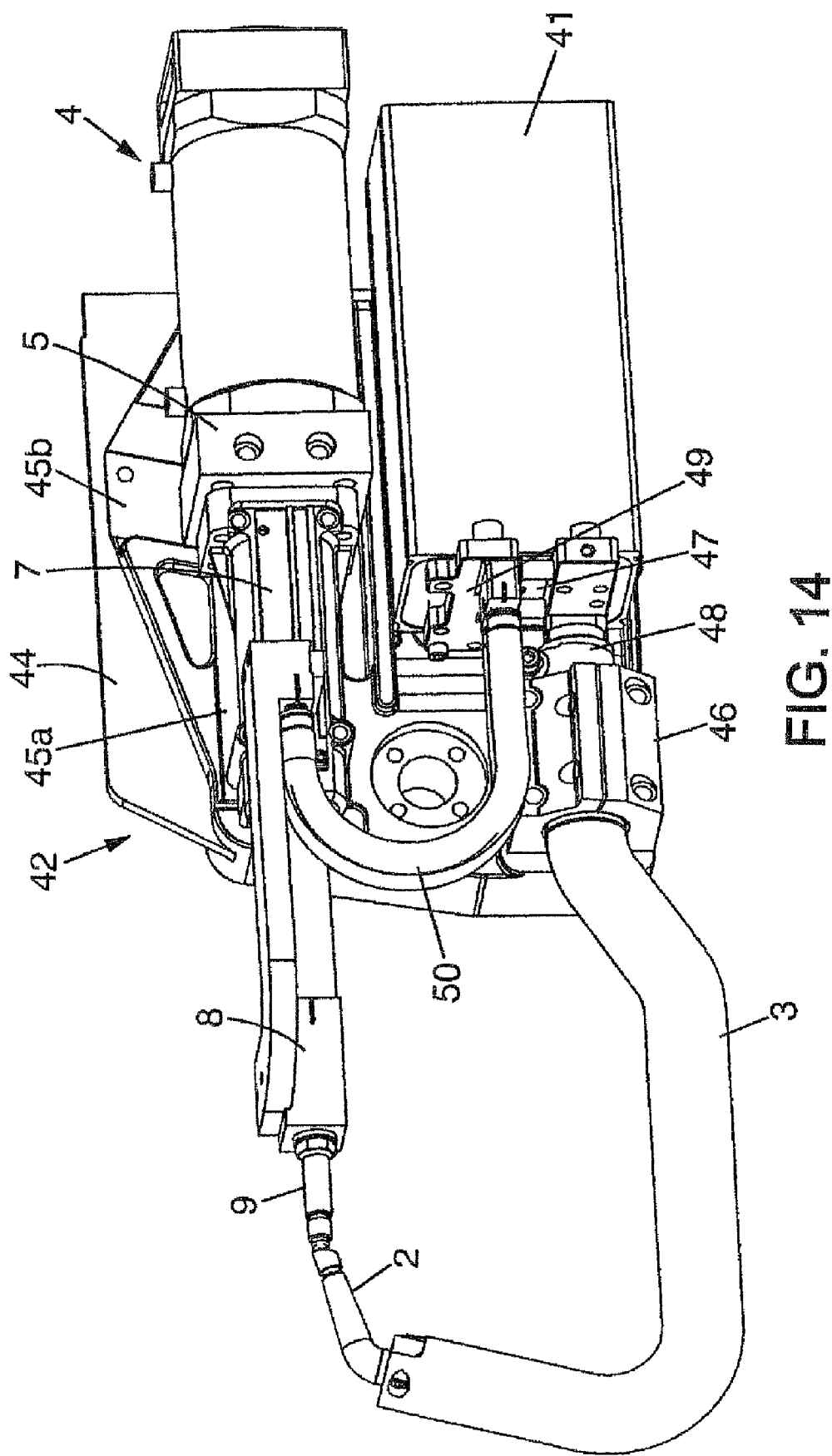
Figure 15:
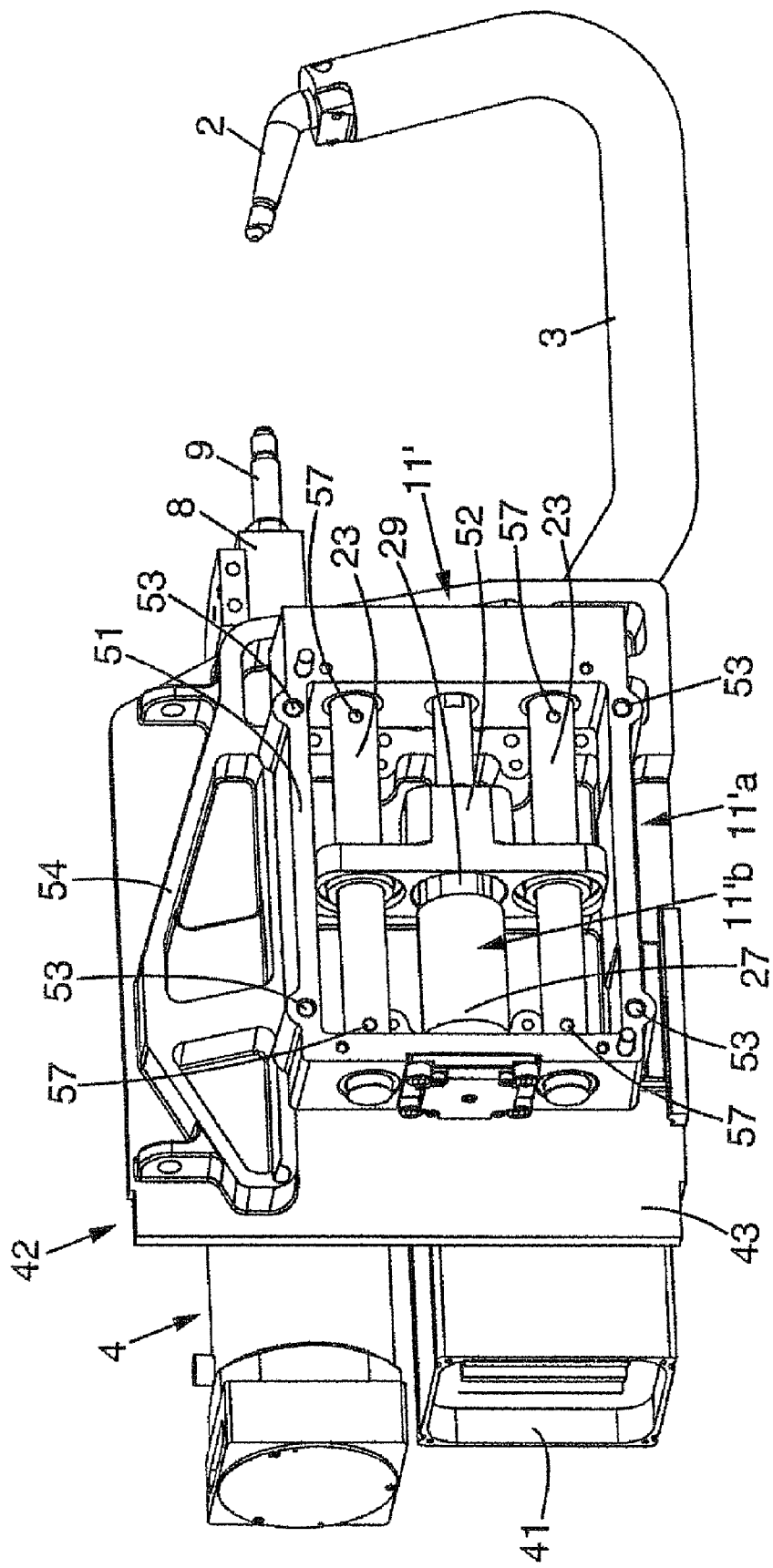
Figure 16:
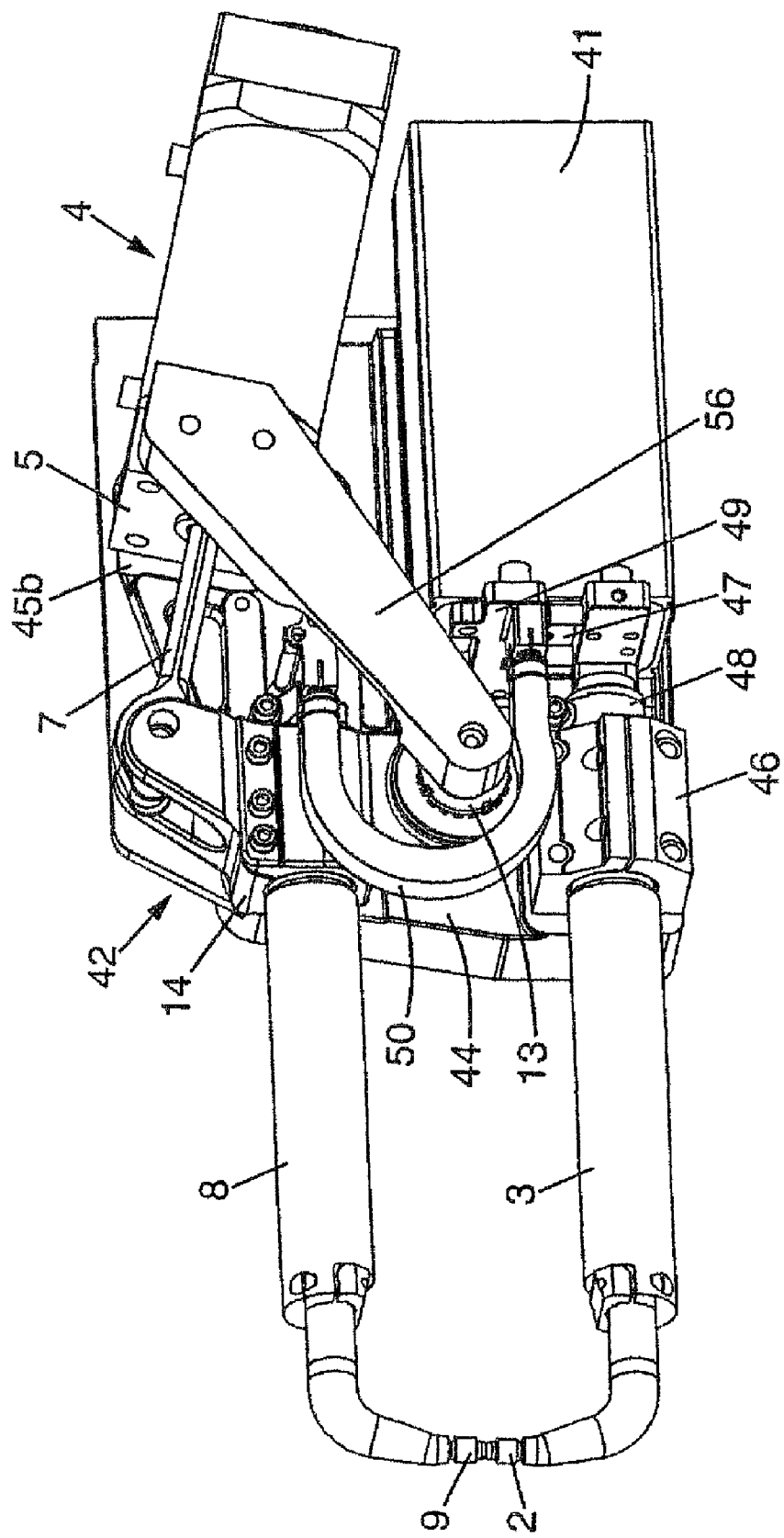
Figure 17:
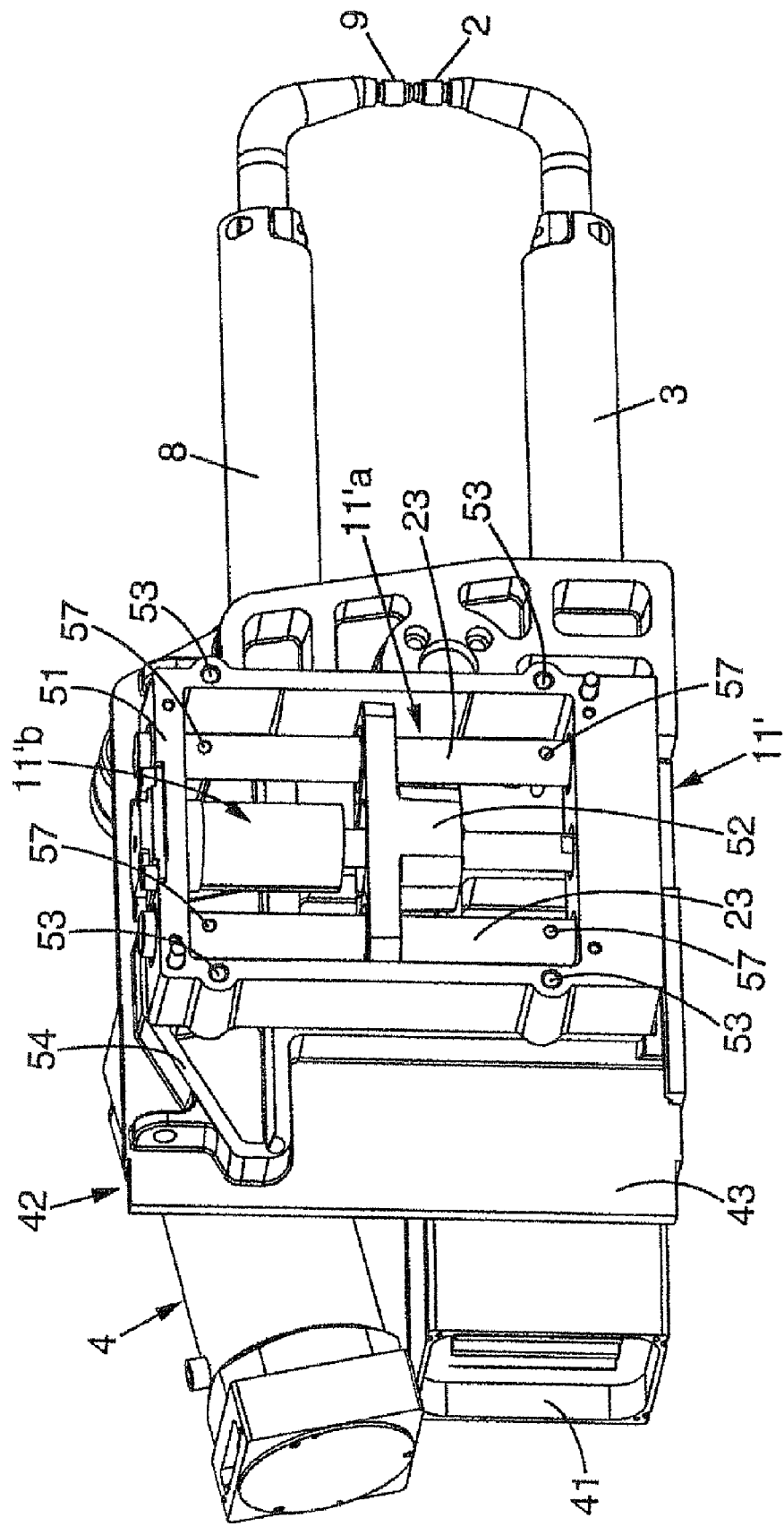
Figure 18:
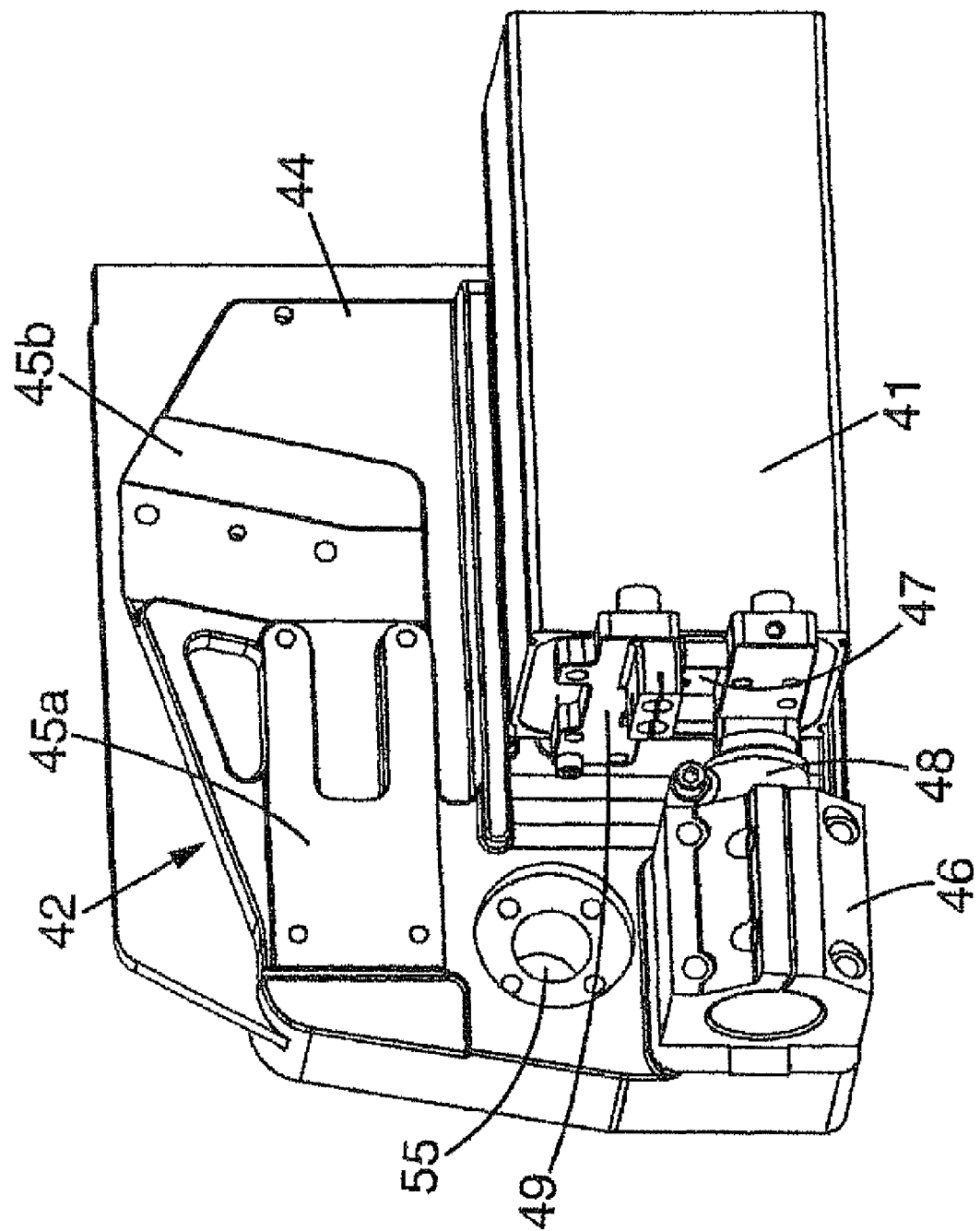

FIGS. 11, 12 and 13 are views similar to FIGS. 8, 9 and 10 respectively for an X gripper, similar to that of FIGS. 6 and 7, fitted with the same independent pneumatic balancing module as the C gripper of FIGS. 8 to 10, this module also being mounted on one of the sides of the gripper and having its linear guidance parallel to the vector $\vec{n}$ perpendicular to the plane of assembly of the plates;

FIGS. 14 and 15 are schematic perspective views, from the gripper side and from the module side respectively, of another C gripper with an interface plate supporting the corresponding independent balancing module;

FIGS. 16 and 17 are views, similar to FIGS. 14 and 15 respectively, of an X gripper with the same interface plate; and FIG. 18 is a view of the interface plate which is common to both the C type and the X type of gripper.

According to the invention, as shown in FIGS. 8 to 18 and as described below, both C grippers and X grippers, which have the same basic structure and operate on the same principle as the similar prior art grippers, are also fitted with a balancing, docking and backing-off module, which itself is constructed in the same way as the known structures to operate on the same principles as the similar prior art modules. Consequently, in FIGS. 8 to 18, the same reference numerals are used to denote the components of the gripper according to the invention which are identical or similar to those of the prior art grippers, and the components of the balancing, docking and backing-off module according to the invention which are similar to those of the prior art, since grippers fitted with these modules according to the invention are not distinguished from prior art grippers fitted with these modules except in the position of the modules, which are offset to the outside of the grippers themselves, where the term "gripper" denotes the assembly formed by the movable subassembly of each gripper and the corresponding frame, said movable subassembly including the two arms and the two electrodes, fixed and movable, together with the welding actuator.

According to the invention, the balancing module, which is advantageously combined with docking and backing-off means, is, in a first example, mounted as an interface between two parts of the support (such as a fixed stand or a manipulator arm), where a first part is fixed to the frame which itself is fixed to the body of the welding actuator of the gripper, while the second part forms the rest of the support or is fixed to the rest of the support. In another example, and as described below with reference to FIGS. 8 to 18, the balancing, docking and backing-off module is mounted as an interface between the support, on the one hand, and, on the other hand, the frame fixed to the body of the welding actuator, and therefore to the movable subassembly of the gripper. In the preferred examples of embodiment of FIGS. 8 to 18, the balancing, docking and backing-off module is transferred, in the form of an independent module, to one side of the gripper itself, forming an interface between the frame and the support.

In these examples, the independent balancing module which is described and illustrated offers one degree of freedom in translation, the advantages of which can also be obtained with an independent offset balancing module, transposed from those described and illustrated, to provide a balancing movement by partial oscillation of the gripper assembly itself (the movable subassembly and the frame) around a shaft.

In grippers according to the invention, the balancing operation can therefore be carried out equally well by either a linear movement or a rotational movement.

In a first example, the gripper with the pneumatic balancing, docking and backing-off module of FIGS. 8 to 10 has the gripper structure itself and the same pneumatic balancing, docking and backing-off module structure as that of the gripper described above with reference to FIGS. 4 to 5, the only differences being that the frame 10 is made in the form of a vertical plate fixed directly to one side of the body 5 of the welding actuator 4 which supports the fixed arm 3 with the fixed electrode 2 and which moves the movable arm 8 with the movable electrode 9 linearly, the body 22 of the guide box 11a being fixed directly to the face of the frame plate 10 on the side opposite the face of this frame plate 10 connected to the movable subassembly (2, 3, 4, 8, 9), and the body of the cylinder 27 of the pneumatic balancing, docking and backing-off actuator 11b being fixed directly to a vertical plate 38, which itself is fixed to the vertical part of a rigid angle bracket 39, forming a support element 40 for the gripper, this support 40 possibly being, as stated above, either a fixed stand or a manipulator arm.

Figure 4:
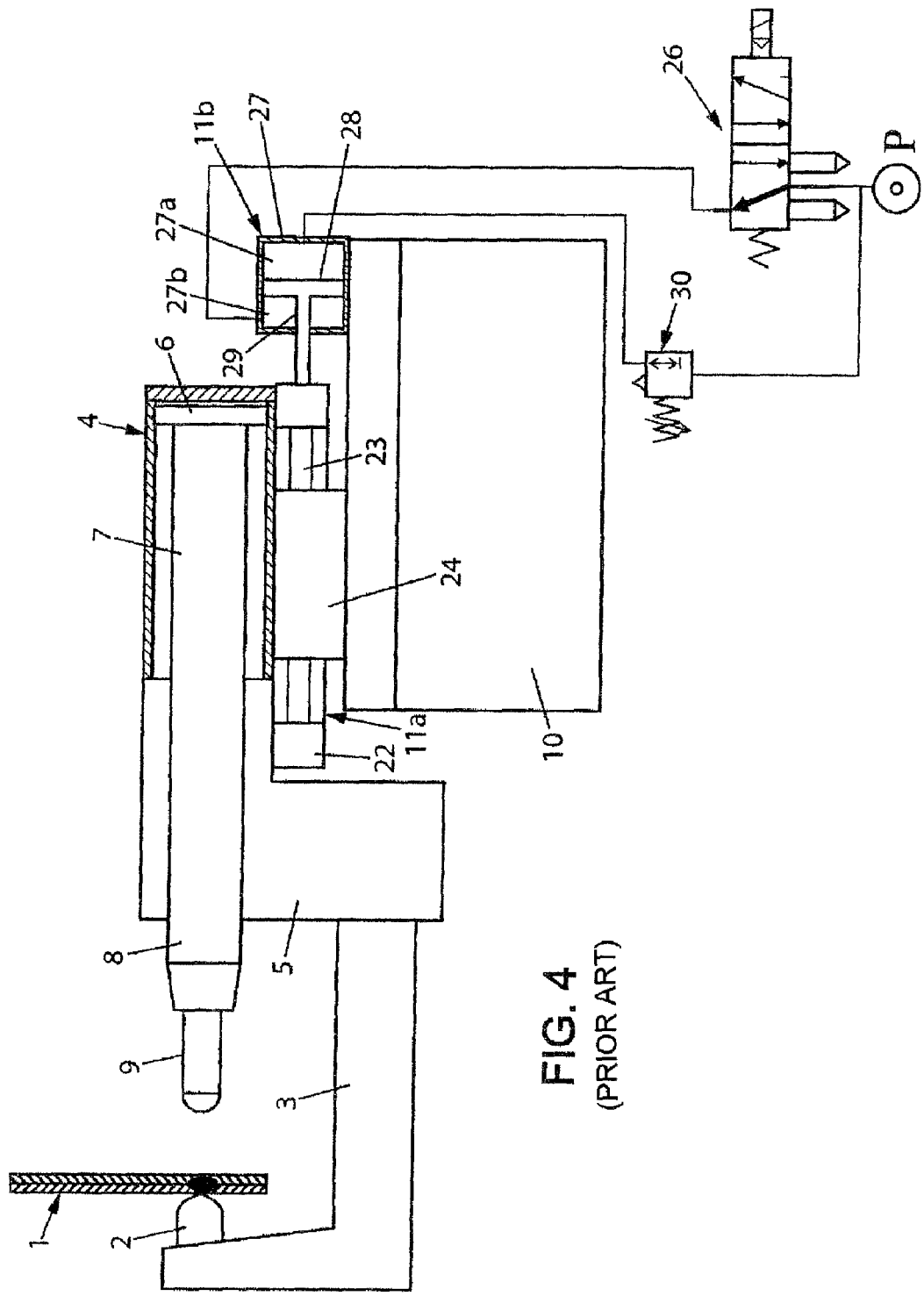
FIG. 4 is a view similar to FIG. 2 of a C gripper according to the prior art having a pneumatic balancing module, in the docking/balancing position.
Figure 5:
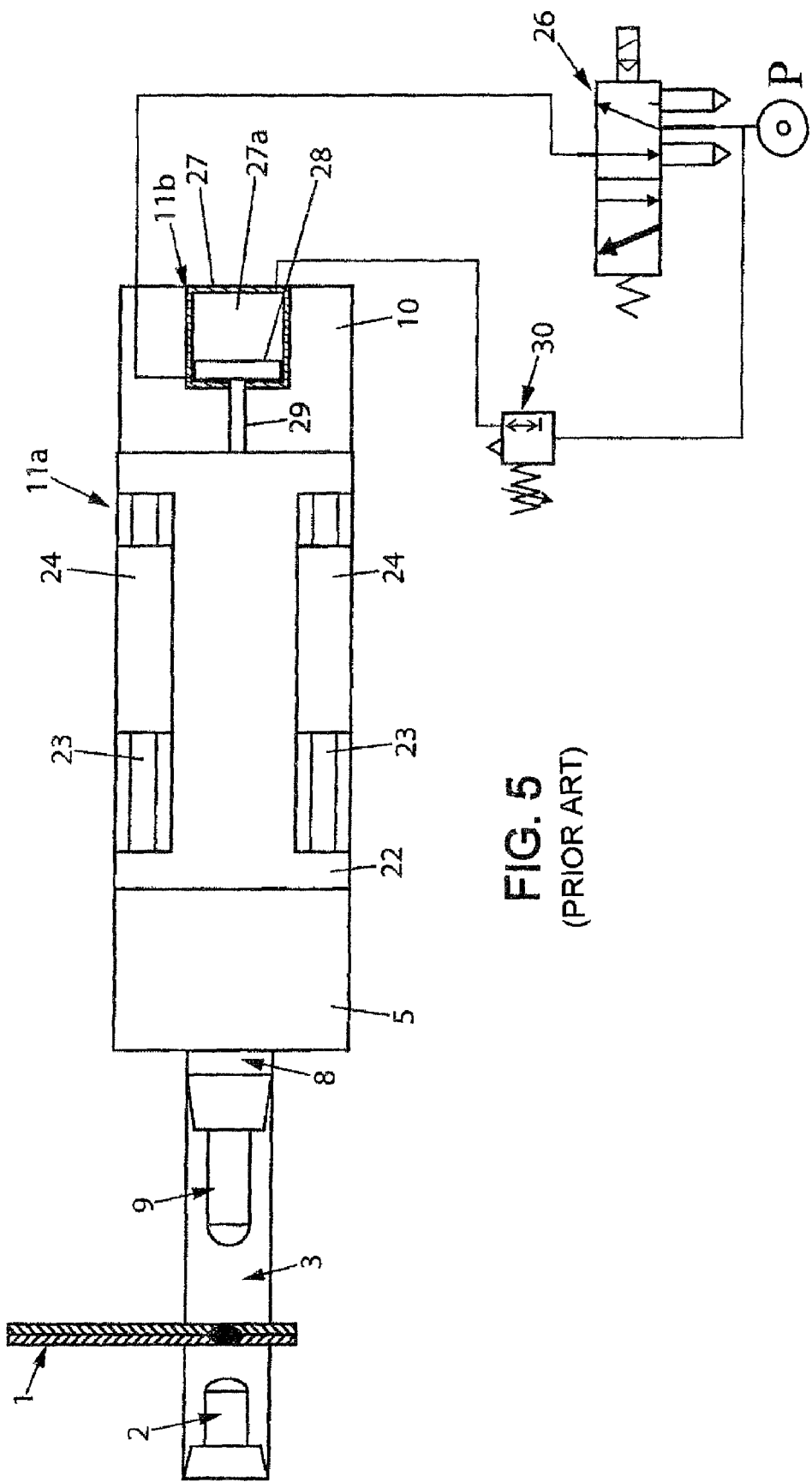
FIG. 5 is a view similar to FIG. 3 of the C gripper of FIG. 4, in the backed-off position.

Another difference is that the two slides or sleeves 24, in which the two guide columns 23 of the guide box 11a are guided in longitudinal translation parallel to the direction of movement of the movable arm 8, are rigidly connected to the support plate 38. Thus the rod 29 connected to the piston of the double-acting pneumatic actuator 11b, which is supplied as shown in FIGS. 4 and 5 by a distributor 26 and a control valve 30 (not shown), moves the body 22 and the guide columns 23 of the guide box 11a by sliding in the sleeves 24 fixed to the support 38-40, parallel to the direction of movement of the movable arm 8 and electrode 9.

Thus the box 11a, and more generally the pneumatic balancing, docking and backing-off module 11, is mounted on one of the sides of the assembly formed by the movable subassembly (2, 3, 4, 8, 9) and the frame 10 of the gripper, with its guidance parallel to the vector $\vec{n}$ perpendicular to the plane of assembly of the plates 1. Clearly, the operation of the gripper itself and of its module 11 is identical to the operation described above with reference to FIGS. 4 and 5.

In a variant, four springs such as the springs 25 of FIGS. 1 to 3 can be mounted around the ends of the two guide columns 23 in the box 11a of FIGS. 8 to 10, in order to form a guide and resilient balancing box 11a, in which case the actuator 11b can be simply a single-acting pneumatic or hydraulic actuator providing the functions of docking, backing-off, and holding the gripper in the backed-off position, as described above with reference to FIGS. 1 to 3.

Thus the welding gripper itself does not incorporate the functions of balancing, docking and backing-off, and the independent balancing, docking and backing-off module is mounted as an interface between the gripper itself, on the one hand, and the support, of the fixed stand or manipulator arm type, on the other hand.

Additionally, as is known in the prior art, a welding transformer 41 is advantageously incorporated in the gripper itself, being fixed to the body 5 of the welding actuator 4 and/or to the frame plate 10.

The second example shown in FIGS. 11 and 13 is that of an X gripper, in which the gripper structure itself is the same as that of the X gripper of FIGS. 6 and 7, and which is fitted with an independent balancing, docking and backing-off module 11 identical to that of the C gripper of FIGS. 8 to 10, but oriented at 90° to the orientation of the module 11 of the example in FIGS. 8 to 10, with respect to the general direction of movement of the welding actuator 4.

This is because, in the X gripper of FIGS. 11 to 13, the electrode 9 at the end of the movable arm 8 is fixed as before to the lever 14 pivoting around the oscillation shaft 13 on the frame 10, which is rigidly connected to the fixed arm 3 with the fixed electrode 2, and on which the body 5 of the welding actuator 4 is mounted pivotably around the shaft 15, the rod 7 of the actuator also pivoting at its end around the shaft 16 on the lever 14, enabling the actuator 4 to cause the oscillation of the movable arm 8 and of the lever 14 around the shaft 13, in order to open or close the gripper on the assembly of plates 1 to be welded.

However, by contrast with the prior art shown in FIGS. 6 and 7, the part of the frame 10 to which the fixed arm 3 and the body 5 of the actuator 4 are rigidly fixed cannot be pivoted around the oscillation shaft 13, with respect to the rest of the frame 10, by means of the double-acting pneumatic actuator which provides the functions of balancing, docking and backing-off, or by a resilient balancing guide box combined with a single-acting backing-off actuator, but the frame 10 takes the form of a vertical lateral frame plate, on one face of which are mounted the components of the movable subassembly, namely the fixed arm 3 and the fixed electrode 2, the movable arm 8 with the movable electrode 9 and the lever 14, and the welding actuator 4, as well as the shafts 13 and 15.

In the same way as in FIGS. 8 to 10, a welding transformer 41 can also be fixed to this face of the welding plate 10, whose other face is rigidly connected to the body 22 of the guide box 11a, which is positioned in such a way that, in this example, its two guide columns 23 which are parallel and spaced apart are vertical and slide longitudinally in the two bushes 24 fixed to one face of the vertical support plate 38, which is itself fixed by its other face to a supporting angle bracket 39 which is rigidly connected by its upper arm to the support 40 (a fixed stand or a manipulator arm), to form a connection between this support 40 and the gripper, the body 27 of the double-acting pneumatic actuator 11b, which provides the pneumatic balancing, docking and backing-off functions, also being fixed rigidly to the support plate 38, and in such a way that its rod 29 is fixed to the body 22 of the guide box 11a, in order to obtain, in this example as before, guidance parallel to the vector n perpendicular to the plane of assembly of the plates 1.

In this case also, the pneumatic balancing, docking and backing-off module 11 is mounted by means of the box 22 on one of the sides of the frame 10 of the gripper, forming an interface between this frame 10 and the support plate 38, the angle bracket 39 and the support itself 40, while the angle bracket 39 and/or the support plate 38 can be omitted, if necessary, depending on the configuration of the support 40.

In a variant, and also in the example of FIGS. 8 to 10, the module 11 can be mounted to form an interface between the plate 38 and the vertical arm of the angle bracket 39, the body 22 of the guide box 11a being fixed for example to the plate 38 and the two sleeves 24 together with the body 27 of the actuator 11b being fixed to the angle bracket 39, or the module 11 can be mounted to form an interface between the horizontal arm of the angle bracket 39 and the support 40, the body 22 of the guide box 11a being fixed, for example, to the angle bracket 39 and the two sleeves 24 and the body 27 of the actuator 11b being fixed to the support 40.

Figure 1:
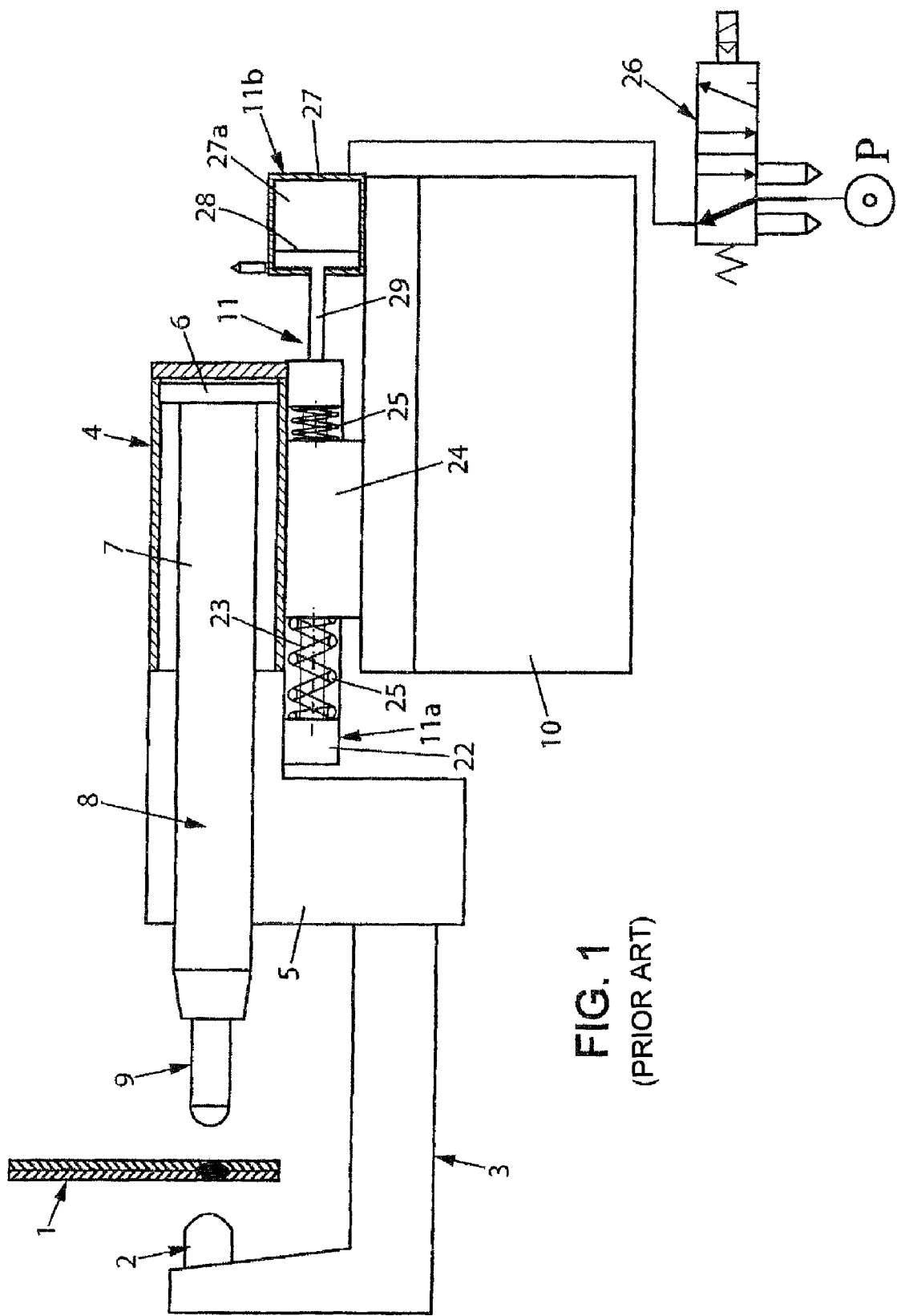
FIG. 1 is a schematic view, partially in axial section and partially in side elevation, of a C gripper according to the prior art with a spring balancing module, in the backed-off position.
Figure 2:
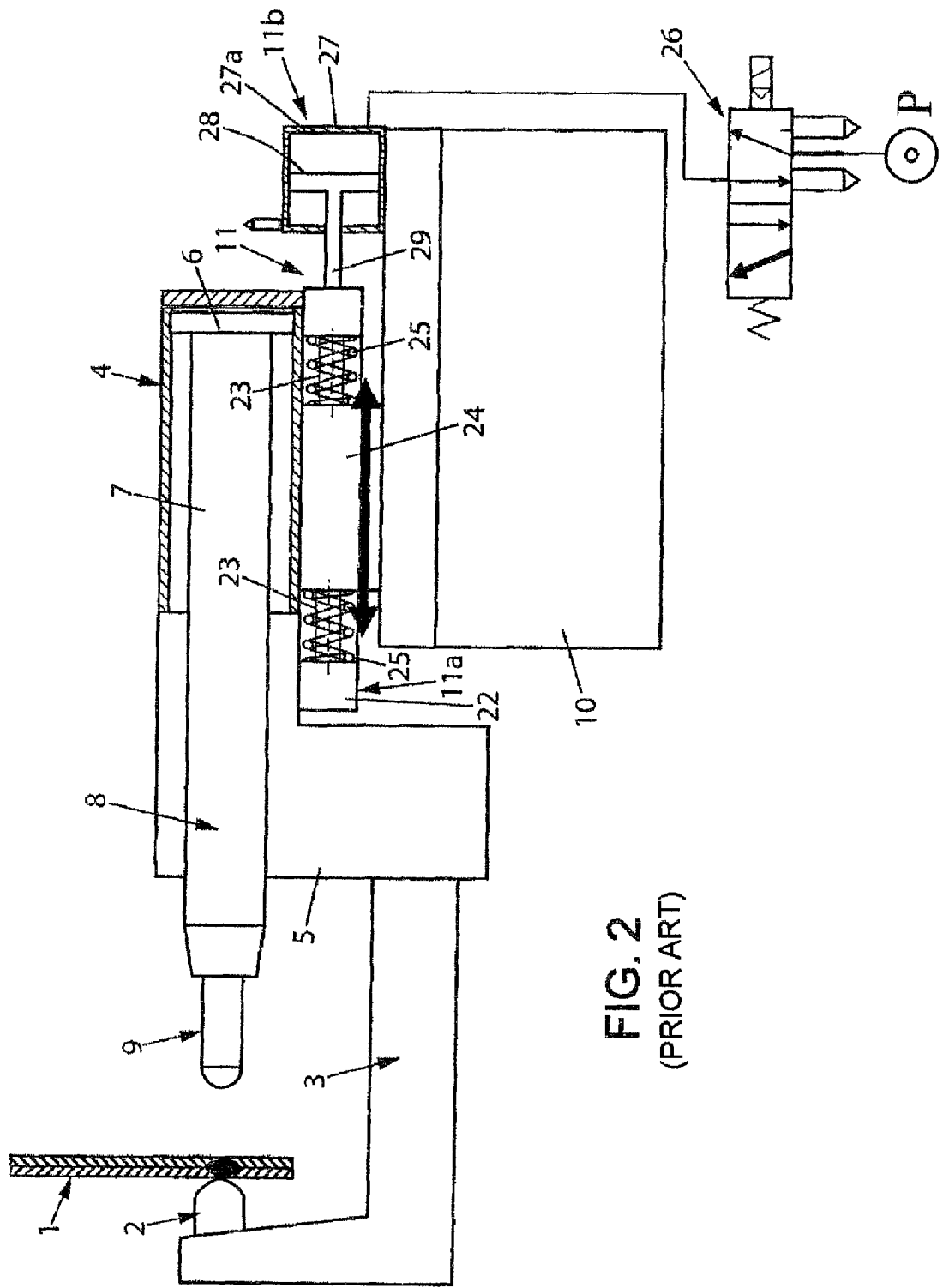
FIG. 2 is a view similar to FIG. 1, showing the C gripper in the docking/balancing position.
Figure 3:
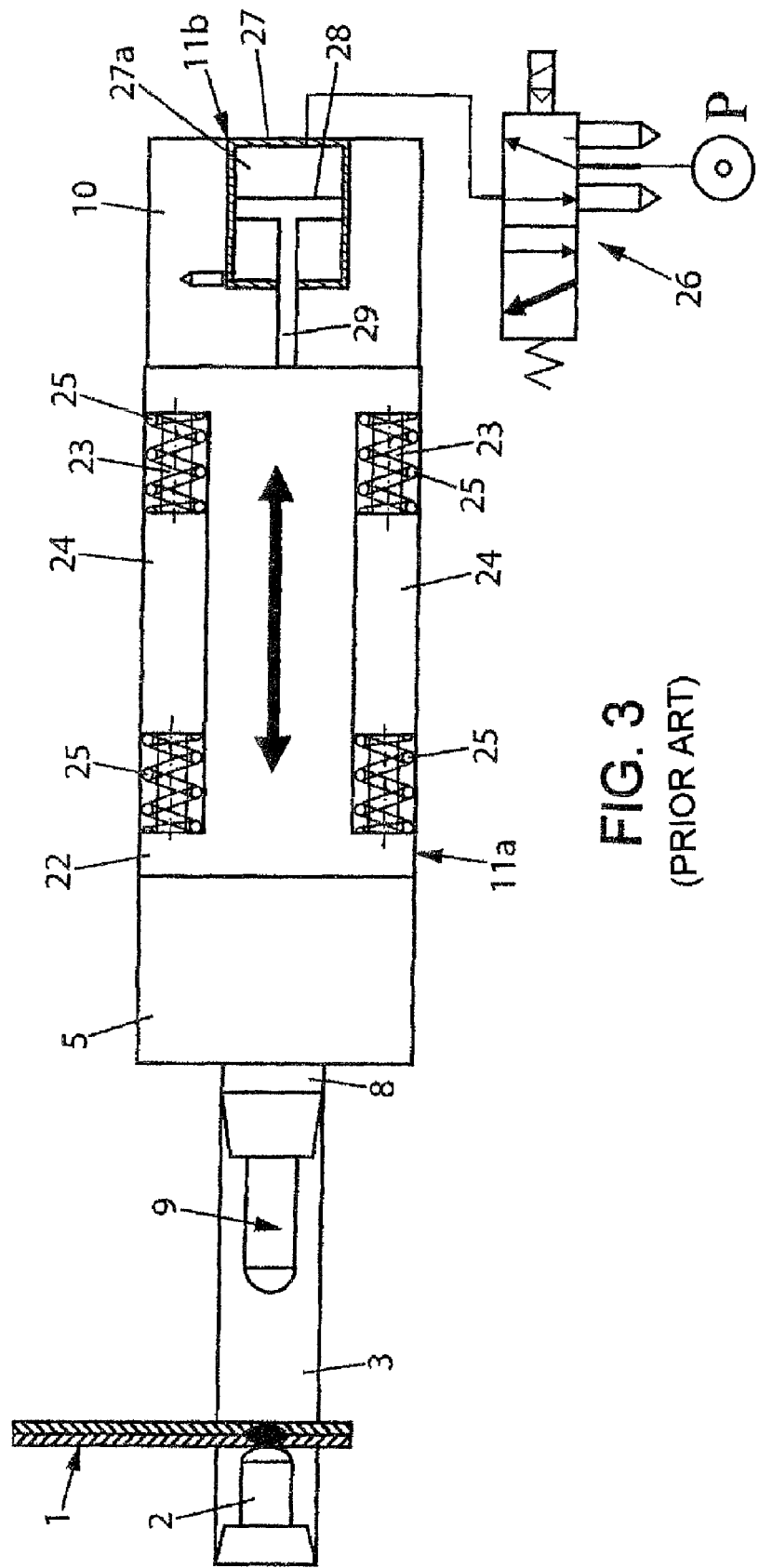
FIG. 3 is a schematic view, partially in plan and partially in horizontal section, of the C gripper in the same position as in FIG. 2.

In another variant, in the example of FIGS. 11 to 13, the columns 23 can be surrounded, on either side of the sleeves 24, with balancing springs 25, as in the prior art shown in FIGS. 1 to 3, in such a way that the movable subassembly of the gripper, together with the frame and, possibly, one or more supporting part or parts fixed rigidly to the frame, are balanced between the springs. In this case, as also in the prior art shown in FIGS. 1 to 3, the associated actuator 11b can be a single-acting hydraulic or pneumatic actuator, providing the backing-off function only.

Therefore, in the example of the C gripper of FIGS. 8 to 10, and in the example of the X gripper of FIGS. 11 to 13, the same balancing module 11 can allow translational movements of the movable subassembly (2, 3, 4, 8, 9) and of its frame 10 with respect to the support 40, the actuator 11b combined with the guide box 11a of this module 11 providing backing-off by enabling the movable subassembly (2, 3, 4, 8, 9) to be returned to the reference position in which it is in abutment with respect to the support 40. In both examples, the translational movements allowed by the module 11 are substantially perpendicular to the plane of assembly of the plates 1 to be welded, being also substantially parallel to the movement of the movable arm 8 in the example of the C gripper of FIGS. 8 to 10, and substantially parallel to the direction of the two electrodes 2 and 9 placed end to end in the closed position of the X gripper of FIGS. 11 to 13.

FIGS. 14 and 15 show another example of a C gripper according to the invention, viewed respectively from the side of the gripper itself in the closed position, and from the side of the independent balancing module with the gripper open, the gripper itself being mounted on one face of one side and the independent balancing module being mounted on the face of the opposite side of a rigid interface plate which is shown in FIG. 18 and which is common to the example of the C gripper of FIGS. 14 and 15 and the example of the X gripper of FIGS. 16 and 17, as described below.

As shown in FIG. 14, the interface plate 42 has, on its face 44 on the side of the gripper itself, two plates 45a and 45b for mounting the welding actuator 4, of which one, namely the plate 45a, is used to fix the body 5 of the welding actuator 4 rigidly against the face 44 of the interface plate 42, on the C gripper of FIGS. 14 and 15.

On the same face 44 there are rigidly fixed the welding transformer 41, possibly using a frame plate supplementing the interface plate 42 to form the rigid frame 10, and a split sleeve 46 fixed to and projecting from this face 44 of the interface plate 42, the opposite end of the fixed arm 3 from the fixed electrode 2 being inserted into this split sleeve and clamped therein by screwing the two parts of the split sleeve 46 toward each other, to fix the fixed arm 3 rigidly to the interface plate 42. Two electrical conductors 48 and 49 are fixed to two secondary outputs 47 of the transformer 41, one of these conductors, namely the conductor 48, fixed under the other conductor 49, being intended to provide the power supply to the fixed arm 3, and therefore extending from one of the secondary outputs 47 of the transformer 41 to the clamping sleeve 46, in such a way that the end of the fixed arm 3 inserted into this sleeve 46 and clamped therein is in electrical contact with the rigid conductor 48. The other rigid conductor 49 provides the power supply to the movable arm 8 and the movable electrode 9 at the free end of the movable arm, preferably using a flexible electrical and fluid connection device 50 for supplying power through at least one central flexible conductor in a flexible sheath which simultaneously supplies cooling water to the movable electrode 9 through the movable arm 8, to which this flexible connecting device 50 is connected, as shown in FIG. 14.

FIG. 15 shows that the independent balancing, docking and backing-off module 11' is mounted on the other face 43 of the interface plate 42, this other face 43 being turned toward a member fixed to the support, for example toward a support plate such as the plate 38 or toward the vertical arm of the supporting angle bracket 39 of FIGS. 10 and 13, the module 11' being able to bear on this member to move the interface plate 42 and, together with it, the movable subassembly (2, 3, 4, 8, 9), and/or the frame 10 if present, forming the gripper itself.

As in the preceding examples, the module 11' is formed by a guide box 11' a and an actuator 11'b. However, in this example the actuator 11'b is mounted inside the guide box 11'a.

This guide box 11'a has a rigid rectangular frame 51 passed through, in a direction with is parallel to two of its opposite sides, preferably the larger sides, by two guide columns 23 which are fixed rigidly to said interface plate 42 by screws through orifices 56 formed in the columns 23. The columns 23 are spaced apart, parallel and guided with respect to translation at their ends on bearings fixed to the frame 51. At least one bar 52 is fixed securely to the columns 23 and is connected to the rod 29 of a linear actuator 11'b of the jack type, which is parallel to the columns 23 and extends between them, and whose cylinder 27 is fixed to the frame 51 of the box 11'. The frame 51 is itself screwed by means of the taps 53 to the manipulator arm or to a rigid stand 40, with the interposition of a support plate such as 38 or the vertical arm of the supporting angle bracket 39 of FIGS. 10 and 13, in such a way that the actuator 11'b can cause the docking, balancing and backing-off of the gripper. Said actuator 11'b is pneumatic, with two pressurized gas chambers, one on each side of a piston connected rigidly by the rod 29 to at least one of the bars 52, in order to form the two opposing resilient balancing means as described in FIGS. 8, 9 and 10.

In this example, the box 11'a is a guide box only, the actuator 11'b being a double-acting pneumatic actuator providing the functions of pneumatic docking, balancing and backing-off; however, in a variant the parts of the columns 23 on either side of the bar 52 can be surrounded by four helical springs to provide spring balancing, in which case the box 11'a is a guide and resilient balancing box, the actuator 11'b possibly being a single-acting hydraulic or pneumatic actuator providing the backing-off function only.

Thus, since the rigid subassembly (23, 52, 29) is fixed to the face 43 of the interface plate 42, and since the frame 51 is rigidly fixed to the support, the actuator 11'b can cause linear movements of the rigid subassembly (23, 52, 29) with the interface plate 42 and the gripper itself on the other face of this plate 42, parallel to the direction of movement imparted by the welding actuator 4 to the movable arm 8 and electrode 9, in other words substantially perpendicularly to the plane of the assembly of plates to be welded.

When the box 11'a provides resilient balancing, each column 23 is surrounded by two opposing helical springs such as the springs 25 of the prior art example shown in FIGS. 1 to 3, each spring bearing at one end on the frame 51 and at the other end on the bar 52, on the opposite side from the other spring. The gripper itself, with the transformer 41 and the interface plate 42, is then balanced between the springs.

When the box 11'a provides longitudinal guidance only, the actuator 11'b is pneumatic, with two pressurized gas chambers, such as the chambers 27a and 27b on either side of a piston, such as the piston 28 of the actuator of FIGS. 4 and 5, and is connected rigidly by the rod 29 to the bar 52, in order to form two opposing resilient balancing means.

In a variant, the rigid subassembly (23, 52, 29) of the box 11'a can be rigidly fixed to the support and the frame 51 can be rigidly fixed to the face 43 of the interface plate 42, in which case the fixing plate 54 on the face 43 of the interface plate 42 being designed so that it can fix the frame 51 in either one or other of at least two positions in which the frame 51 is oriented in such a way that it can slide along the columns 23 in two directions perpendicular to each other, to enable the same interface plate 42 and the same module 11' to be used on an X gripper also, as shown in FIGS. 16 and 17.

In order to be compatible with an X gripper also, the interface plate 42 also has a circular transverse aperture 55, forming a bearing designed to receive the oscillation shaft 13 of the lever 14 which rigidly supports the movable arm 8 with the movable electrode 9 of the X gripper, as shown in FIG. 16. In FIG. 16, a reinforcing plate 56 is fixed rigidly between the end of the articulation shaft 13 and the body 5 of the welding actuator 4, which is mounted so that its body 5 can pivot on the plate 45b on the face 44 of the interface plate 42. As in the preceding examples of X grippers, the rod 7 of the welding actuator 4 is also mounted so that its end outside the body 5 can pivot in an upper yoke of the lever 14 which is thus oscillated together with the movable arm 8 by the actuator 4 around the shaft 13.

In order to provide the balancing, docking and backing-off functions of this X gripper, the same independent module 11, as that of the C gripper of FIGS. 14 and 15 is mounted on the other face 43 of the interface plate 42, but, in order to allow for the fact that, in this X gripper, the two electrodes 2 and 9 are at the ends of the arms 3 and 8 which are curved towards each other, and that the vector $\vec{n}$ perpendicular to the plane of assembly of the plates to be welded is therefore oriented substantially vertically, and not substantially horizontally as in the C gripper of FIGS. 14 and 15, this independent module 11' is fixed to the mounting plate 54 on this face 43 of the interface plate 42 in such a way that the columns 23 of the guide box 11'a and the actuator 11'b are oriented substantially vertically, which is easily permitted by screwing four bolts through orifices 57 in the columns 23 to fix the rigid subassembly (23, 52, 29) of the guide box 11'a, the mounting plate 54 being therefore provided with tapped bores.

Thus the module 11', which operates in the same conditions and in the same way as in the C gripper of FIGS. 14 and 15, still provides a degree of freedom in translation perpendicularly to the plane of the assembly of plates to be welded.

The balancing, docking and backing-off module 11' can therefore be mounted on the face 43 of the interface plate 42 in one or another of four positions allowing translational movements substantially parallel to one or other of two directions which are substantially perpendicular to each other, in the plane of the face 43, two positions opposite each other corresponding to the substantially horizontal direction, for a C gripper as shown in FIGS. 14 and 15, and the other two opposite positions corresponding to the substantially vertical direction, for the X gripper as shown in FIGS. 16 and 17. If the directions of action of the balancing module have to be inclined with respect to each other, when changing from a C gripper to an X gripper and vice versa, without these directions being perpendicular to each other, the means for fixing the rigid frame 51 to the plate 54 of the interface plate 42 must be designed accordingly.

In the different embodiments of X and C grippers according to the invention, it will be noted that the offsetting of the balancing, docking and backing-off functions to the outside of the assembly formed by the movable subassembly of the gripper itself and its frame makes it possible to have a larger number of components and subassemblies common to both types of gripper, while reducing the number of moving elements in the gripper itself.

Another result is that the invention makes it possible to provide the balancing, docking and backing-off functions in the form of an optional independent module, without increasing the cost of the basic gripper, which may be of the C or X type; this is particularly advantageous in the case of applications not requiring the balancing function, as in the case where positioning is provided by a robot. A further result is a considerable simplification of the basic gripper, and also of the balancing module, which can be common and standardized for all grippers, regardless of whether their kinematics are of the X or C type, because the module is fixed to one of the lateral faces of the gripper, preferably with the interposition of an interface plate, on which it is simply necessary to orient the guide box, or the guide and balancing box if appropriate, in order to provide a movement of the fixed arm and electrode which is substantially perpendicular to the plane of assembly of the plates.

The invention claimed is:

1. A gripper for clamping plates, to be used in combination with a manipulator arm called a robot, and comprising:
    a rigid frame, connected to a support;
        a movable subassembly connected to said frame, and having:
        a first arm, called the fixed arm,
        a second arm, called the movable arm, and
        an actuator supported on said fixed arm in order to move said movable arm with respect to said fixed arm, along a first degree of freedom, in translation or rotation, so as to adopt a closed position or an open position of the gripper, in order respectively to clamp an assembly of plates between said fixed and moving arms or in order to release the assembly of plates, and
    a balancing module, introducing an additional degree of freedom in translation or rotation between said support on the one hand, and an assembly incorporating said movable subassembly on the other hand, in order to balance forces which are exerted on ends of said fixed and moving arms respectively in said closed position, wherein said balancing module is offset to an outside of said assembly formed by said movable subassembly and said frame, forming an independent module, to one side of the gripper, and operatively connected between said support and at least one of said frame and said movable subassembly.

2. The gripper as claimed in claim 1, wherein said balancing module is combined with docking means, enabling a fixed end of said fixed arm to be brought into contact with the assembly of plates, by a movement of said movable subassembly after a release of said additional degree of freedom, following an initial positioning of the gripper in open position with an initial clearance between the assembly of plates and said fixed end.

3. The gripper as claimed in claim 1, wherein said balancing module is combined with backing-off means enabling said movable subassembly to be returned to the reference position, in which said movable subassembly is in abutment with respect to said support, and kept there.

4. The gripper as claimed in claim 1, wherein said balancing module is mounted to form an interface between two parts of said support, of which a first part is fixed to at least one of said frame and said movable subassembly and a second part forms a rest of said support or is fixed to said rest of the said support.

5. The gripper as claimed in claim 1, wherein said balancing module is fixed on at least one of a side of said frame supporting said movable subassembly and a side of said body of said actuator of said movable subassembly.

6. The gripper as claimed in claim 1, wherein said balancing module allows translational or rotational movements of said movable subassembly and of its said frame with respect to said support.

7. The gripper as claimed in claim 1, wherein said balancing module comprises:
   at least one guide box for guiding the relative movement, along said additional degree of freedom, between said movable subassembly with said frame and said support,
   at least two resilient balancing means which stress in opposite directions at least one member which is guided in said guide box or which is fixed to said guide box with respect to movement, and
   at least one actuator for docking and backing-off said movable subassembly and for locking and holding said movable subassembly in a backed-off position.

8. The gripper as claimed in claim 7, wherein said balancing module is mounted on a first face of an interface plate which is turned toward a member fixed to said support, said balancing module bearing on said member to move said interface plate which is fixed by a second face to at least one of said frame and said movable subassembly.

9. The gripper as claimed in claim 8, wherein said balancing module is mountable on said first face of said interface plate, in one or another of at least two positions allowing translational movements substantially parallel to one or another, respectively, of at least two directions which are inclined to each other in a plane of said first face, according to whether the gripper is of the C type or the X type, which have, respectively, translational and rotational movements of said movable arm with respect to said fixed arm.

10. The gripper as claimed in claim 8, wherein said second face of said interface plate is provided with means for rigidly fixing said fixed arm and said actuator of said movable subassembly.

11. The gripper as claimed in claim 8, which is a resistance welding gripper and in that wherein said ends of said fixed and movable arms respectively are welding electrodes.

12. The gripper as claimed in claim 11, wherein a welding transformer is incorporated in said assembly of said movable subassembly and said frame, and is fixed to at least one of said frame and said fixed arm.

13. The gripper as claimed in claim 12, wherein said welding transformer is fixed rigidly to said second face of said interface plate.

14. The gripper as claimed in claim 13, wherein said second face of said interface plate is provided with means for rigidly fixing said fixed arm and said actuator of said movable subassembly and two electrical conductors are fixed on an output of said welding transformer, each conductor being arranged to supply power to a respective one of said movable and fixed arms of said movable subassembly, the conductor intended for said fixed arm extending from said output of said transformer to a clamping sleeve which is fixed to and projects from said second face of said interface plate to fix said fixed arm rigidly to said interface plate.

15. The gripper as claimed in claim 8, wherein said interface plate is pierced by a through hole designed to receive an articulation shaft of the rotationally movable arm, said articulation shaft preferably being additionally mounted in a reinforcing plate fixed rigidly between said articulation shaft and the welding actuator, in an X type gripper.

16. The gripper as claimed in claim 1, wherein said balancing module is fitted on a C type gripper, having a linear movement of said movable arm with respect to said fixed arm in such a way that translational movements allowed by said balancing module are substantially parallel to movements of said movable arm, and are substantially perpendicular to a plane of assembly of the plates.

17. The gripper as claimed in claim 1, wherein said balancing module is fitted on an X type gripper, having a rotational movement of said movable arm with respect to said fixed arm, in such a way that translational movements allowed by said balancing module are substantially perpendicular to a plane of assembly of the plates, and are substantially parallel to the direction of said two electrodes placed end to end in said closed position of the gripper.

18. A gripper for clamping plates, to be used in combination with a manipulator arm called a robot, and comprising:
   a rigid frame, connected to a support;
   a movable subassembly connected to said frame, and having:
      a first arm, called the fixed arm,
      a second arm, called the movable arm, and
      an actuator supported on said fixed arm in order to move said movable arm with respect to said fixed arm, along a first degree of freedom, in translation or rotation, to adopt a closed position or an open position of the gripper, in order respectively to clamp an assembly of plates between said fixed and moving arms or in order to release the assembly of plates, and
   a balancing module, introducing an additional degree of freedom in translation or rotation between said support on the one hand, and a assembly incorporating said movable subassembly on the other hand, in order to balance forces which are exerted on ends of said fixed and moving arms respectively in said closed position, wherein said balancing module is offset to an outside of said assembly formed by said movable subassembly and said frame, said balancing module comprising:
      at least one guide box for guiding the relative movement along said additional degree of freedom, between said movable subassembly with said frame and said support,
      at least two resilient balancing means which stress in opposite directions at least one member which is guided in said guide box or which is fixed to said guide box with respect to movement, and
      at least one actuator for docking and backing-off said movable subassembly and for locking and holding said movable subassembly in a backed-off position,
   said balancing module being mounted on a first face of an interface plate which is turned toward a member fixed to said support, said balancing module bearing on said member to move said interface plate which is fixed by a second face to at least one of said frame and said movable subassembly, and
   said guide box having a rigid rectangular frame which is passed through in a way parallel to two opposite sides by two guide columns which are fixed rigidly to said interface plate, are spaced apart from each other and parallel, and are guided in translation at ends of said columns on bearings fixed to said fame, at least one bar being fixed securely to said columns and being connected to a rod of a linear actuator of the jack type, parallel to said columns and extending between said columns, a cylinder of said actuator being fixed to said frame of said guide box, said frame being fixed directly or by means of a rigid intermediate support to a manipulator arm or to a rigid stand, or, conversely, said frame being fixed rigidly to said first face of the said interface plate, while a rigid subassembly formed by said columns and said bar or bars is fixed directly or by means of a rigid intermediate support to said manipulator arm or to said rigid stand, in such a way that said actuator can provide docking and backing-off movements, at least one guide column being surrounded by two opposite helical springs, each of which has one end bearing on said frame and on the other end bearing on at least one of said bars, on the side opposite the other spring, or said actuator being pneumatic with two pressurized gas chambers, one by either side of a piston connected rigidly by said rod to at least one of said bars, in order to form two opposite resilient balancing means.

* * * * *